(12) United States Patent
Wilson

(10) Patent No.: US 8,042,787 B2
(45) Date of Patent: *Oct. 25, 2011

(54) DUAL FLUSH ACTIVATION

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 661 days.

This patent is subject to a terminal disclaimer.

(21) Appl. No.: 11/711,391

(22) Filed: Feb. 27, 2007

(65) Prior Publication Data

US 2007/0210271 A1 Sep. 13, 2007

Related U.S. Application Data

(60) Provisional application No. 60/776,993, filed on Feb. 27, 2006, provisional application No. 60/849,042, filed on Oct. 3, 2006.

(51) Int. Cl.
*F16K 31/12* (2006.01)
(52) U.S. Cl. ............................... 251/40; 251/38
(58) Field of Classification Search ............ 251/33, 251/38, 40
See application file for complete search history.

(56) References Cited

U.S. PATENT DOCUMENTS

| | | | |
|---|---|---|---|
| 605,621 A | 6/1898 | Acklin |
| 934,353 A | 9/1909 | Prichett |
| 1,114,398 A | 10/1914 | Sloan |
| 1,323,703 A | 12/1919 | Linfoot |
| 1,479,313 A | 1/1924 | Pallavicini |
| 1,519,654 A | 12/1924 | Banta |
| 1,868,520 A | 7/1932 | Brooks |
| 1,868,591 A | 7/1932 | Tanner |
| 1,896,950 A | 2/1933 | Groeniger |
| 1,912,937 A | 6/1933 | George |
| 1,992,381 A | 2/1935 | Lyons |
| 2,038,135 A | 4/1936 | Sloan |
| 2,136,221 A | 11/1938 | Sloan |
| 2,164,760 A | 7/1939 | Wesson |
| 2,210,860 A | 8/1940 | Regnell |
| 2,369,104 A | 2/1945 | Frederickson |
| 2,472,576 A | 6/1949 | Dobrick |

(Continued)

FOREIGN PATENT DOCUMENTS

WO    WO 2005/124210    12/2005

(Continued)

OTHER PUBLICATIONS

Six-Liter Water Closets Equipped with a Dual Flushing Device, ASME A112.19. 14-2001, 1 page.

(Continued)

*Primary Examiner* — John K Fristoe, Jr.
*Assistant Examiner* — Marina Tietjen
(74) *Attorney, Agent, or Firm* — Foley & Lardner LLP

(57) ABSTRACT

A handle assembly for providing dual flush functionality to a flush valve. The handle assembly comprising a handle and a plunger engagable with each other. The plunger axially slidable in a bush disposed between the handle and the flush valve. The bushing having a passage for receiving the plunger. The plunger having a first and a second axis along which the plunger may travel through the passage. Movement of the handle moves the plunger from first axis to the second axis wherein actuation of the flush valve by the plunger along the first axis results in a different flush volume than actuation along the second axis.

22 Claims, 7 Drawing Sheets

U.S. PATENT DOCUMENTS

| | | |
|---|---|---|
| 2,511,545 A | 6/1950 | Roselair |
| 2,612,187 A | 9/1952 | Romanelli et al. |
| 2,620,826 A | 12/1952 | Johns |
| 2,734,712 A | 2/1956 | Fraser |
| 2,738,946 A | 3/1956 | Filliung |
| 2,775,772 A | 1/1957 | Clarke |
| 2,858,846 A | 11/1958 | Parker |
| 3,026,536 A | 3/1962 | Wood |
| 3,085,779 A | 4/1963 | Philippe |
| 3,141,177 A | 7/1964 | Kertell |
| 3,207,467 A | 9/1965 | Bühler |
| 3,211,416 A * | 10/1965 | Billeter et al. ............... 251/54 |
| 3,279,742 A | 10/1966 | Billeter |
| 3,334,359 A | 8/1967 | Weingartner |
| 3,365,730 A | 1/1968 | Chiappetta |
| 3,380,077 A | 4/1968 | Armstrong |
| 3,399,860 A | 9/1968 | Billeter et al. |
| 3,406,940 A | 10/1968 | Kertell |
| 3,419,912 A | 1/1969 | Kertell |
| 3,635,103 A | 1/1972 | Monti |
| 3,695,254 A | 10/1972 | Blum |
| 3,745,591 A | 7/1973 | Girten |
| 3,775,778 A | 12/1973 | Lee |
| 3,778,023 A | 12/1973 | Billeter |
| 3,787,902 A | 1/1974 | McCombs |
| 3,806,962 A | 4/1974 | Sievers |
| 4,022,380 A | 5/1977 | Scragg |
| 4,025,968 A | 5/1977 | Davis |
| 4,080,669 A | 3/1978 | Biggerstaff |
| 4,101,986 A | 7/1978 | Ng et al. |
| 4,114,204 A | 9/1978 | Blach |
| 4,134,570 A | 1/1979 | Walker |
| 4,135,263 A | 1/1979 | Anderson |
| 4,160,294 A | 7/1979 | Crumby |
| 4,202,525 A | 5/1980 | Govaer et al. |
| 4,240,168 A | 12/1980 | Duke |
| 4,272,052 A | 6/1981 | Gidner |
| 4,327,891 A | 5/1982 | Allen et al. |
| 4,576,272 A | 3/1986 | Morgan, Jr. et al. |
| 4,817,913 A | 4/1989 | Whiteside |
| 4,883,254 A | 11/1989 | Whiteside |
| 4,893,645 A | 1/1990 | Augustinas et al. |
| 5,026,021 A | 6/1991 | Pino |
| 5,062,453 A | 11/1991 | Saadi et al. |
| 5,244,179 A | 9/1993 | Wilson |
| 5,415,374 A | 5/1995 | Carroll et al. |
| 5,431,181 A | 7/1995 | Saadi et al. |
| 5,476,244 A | 12/1995 | Carroll et al. |
| 5,497,802 A | 3/1996 | Whiteside |
| 5,505,427 A | 4/1996 | Whiteside |
| 5,535,781 A | 7/1996 | Paterson et al. |
| 5,730,415 A | 3/1998 | Gronwick |
| 5,881,993 A | 3/1999 | Wilson et al. |
| 6,019,343 A | 2/2000 | Tsai |
| 6,056,261 A | 5/2000 | Aparicio et al. |
| 6,094,753 A | 8/2000 | Korte |
| 6,112,763 A | 9/2000 | Orbell |
| 6,120,189 A | 9/2000 | Beagle et al. |
| 6,173,456 B1 | 1/2001 | Nieto |
| 6,178,567 B1 | 1/2001 | Bliss |
| 6,189,554 B1 | 2/2001 | Pino |
| 6,227,219 B1 | 5/2001 | Pino |
| 6,240,826 B1 | 6/2001 | Zernickel et al. |
| 6,263,520 B1 | 7/2001 | Song |
| 6,282,731 B1 | 9/2001 | Mohrman |
| 6,299,127 B1 | 10/2001 | Wilson |
| 6,317,899 B1 | 11/2001 | Brewer |
| 6,336,229 B1 | 1/2002 | Guo |
| 6,385,786 B1 | 5/2002 | Lester |
| 6,408,873 B1 | 6/2002 | Hall et al. |
| 6,442,772 B2 | 9/2002 | Han et al. |
| 6,467,100 B2 | 10/2002 | Leach |
| 6,484,327 B2 | 11/2002 | Hand |
| 6,510,563 B1 | 1/2003 | Jarosinski et al. |
| 6,554,018 B1 | 4/2003 | Pino |
| 6,604,249 B2 | 8/2003 | Han et al. |
| 6,643,855 B1 | 11/2003 | Huang |
| 6,651,265 B2 | 11/2003 | Kwen |
| 6,704,945 B2 | 3/2004 | Bellmore |
| 6,729,602 B2 | 5/2004 | Hankin, Jr. et al. |
| 6,785,913 B2 | 9/2004 | Ho |
| 6,823,534 B2 | 11/2004 | Li |
| 6,829,787 B1 | 12/2004 | Pipenburg |
| 6,898,808 B2 | 5/2005 | Molho et al. |
| 6,905,108 B2 | 6/2005 | Hall et al. |
| 7,062,801 B2 | 6/2006 | Oliver |
| 7,481,413 B2 | 1/2009 | Funari |
| 7,607,635 B2 | 10/2009 | Wilson |
| 2002/0047102 A1 | 4/2002 | Hankin et al. |
| 2003/0089867 A1 | 5/2003 | Hall et al. |
| 2003/0110555 A1 | 6/2003 | Tate |
| 2005/0050625 A1 | 3/2005 | Bayer |
| 2006/0033060 A1 | 2/2006 | Funari |
| 2006/0151729 A1 | 7/2006 | Wilson |
| 2009/0133186 A1* | 5/2009 | Maercovich ............... 4/324 |
| 2010/0006155 A1 | 1/2010 | Funari |

FOREIGN PATENT DOCUMENTS

| | | |
|---|---|---|
| WO | WO2007/098269 | 8/2007 |

OTHER PUBLICATIONS

Transmittal Letter for Request for Inter Partes Reexamination of U.S. Patent No. 7,481,413, filed May 11, 2009.

Request for Inter Partes Reexamination of U.S. Patent No. 7,481,413, filed May 11, 2009.

Appendix B: Information Disclosure Statement for Reexamination of U.S. Patent No. 7,481,413, filed May 11, 2009.

Appendix C: Chart Comparing Claims 1, and 4-16 of the '413 to the teachings of the U.S. Patent No. 2,210,860 issued to Regnell on Aug. 6, 1940 ("the Regnell Reference") file with the Reexamination of U.S. Patent No. 7,481,413, filed May 11, 2009.

Appendix D: Chart Comparing Chart Comparing Claims 1-16 of the '413 to the Teachings of U.S. Patent No. 2,210,860 Issued to Regnell and to Other Cited Prior Art References filed with the Reexamination of U.S. Patent No. 7,481,413, filed May 11, 2009.

Appendix E: Chart Comparing Chart Comparing Claims 1-16 of the '413 to the Teachings of U.S. Patent No. 2,620,826 on Mar. 24, 1949, ("The Johns Reference") and Other Cited Prior Art References filed with the Reexamination of U.S. Patent No. 7,481,413, filed May 11, 2009.

Appendix F: Chart Comparing Claims 1-16 of the '413 to the teachings of the U.S. Patent No. 1,912,937 Issued to George on Jun. 6, 1933, (the George Reference) filed with the Reexamination of U.S. Patent No. 7,481,413, filed May 11, 2009.

Appendix G: Chart Comparing Chart Comparing Claims 1-16 of the '413 to the Teachings of the George Reference and Other Cited Prior Art References filed with the Reexamination of U.S. Patent No. 7,481,413, filed May 11, 2009.

Appendix H: Chart Comparing Claims 1-16 of the '413 to the teachings of the U.S. Patent No. 3,207,467 issued to Buhler on Aug. 5, 1963 ("the Buhler Reference") filed with the Reexamination of U.S. Patent No. 7,481,413, filed May 11, 2009.

Appendix I: Chart Comparing Chart Comparing Claims 1-16 of the '413 to the Teachings of the Buhler Reference and Other Cited Prior Art References filed with the Reexamination of U.S. Patent No. 7,481,413, filed May 11, 2009.

Appendix J, Sloan Flush Valves Catalog 32, Chicago, Illinois, filed with the Reexamination of U.S. Patent No. 7,481,413, filed May 11, 2009.

Appendix K, Sloan Flush Valves Catalog 40, Chicago, Illinois filed with the Reexamination of U.S. Patent No. 7,481,413, filed May 11, 2009.

Corrected Request for Inter Partes Reexamination of U.S. Patent No. 7,481,413 filed Jul. 10, 2009.

Appendix B: filed with the Corrected Request for Inter Partes Reexamination of U.S. Patent No. 7,481,413, filed Jul. 10, 2009.

"Six-Liter Water Closets Equipped with a Dual Flushing Device", American Society of Mechanical Engineers (ASME), A112.19.14-2001, issued Aug. 1, 2002, New York, NY, filed with the Corrected Request for Inter Partes Reexamination of U.S. Patent No. 7,481,413, filed Jul. 10, 2009.

Appendix C: Chart Comparing Claims 1, and 4-16 of the '413 to the teachings of the U.S. Patent No. 2,210,860 issued to Regnell on Aug. 6, 1940 ("the Regnell Reference") filed with the Corrected Request for Inter Partes Reexamination of U.S. Patent No. 7,481,413, filed Jul. 10, 2009.

Appendix D: Chart Comparing Claims 1-16 of the 413 to the Teachings of U.S. Patent No. 2,210,860 Issued to Regnell in View of the U.S. Patent No. 5,730,415 Issued to Gronwick on Mar. 24, 1990 (the "Gronwick Reference") and Further in View of the American Society of Mechanical Engineers A112.19.14-2001 Issued Aug. 1, 2002 ("the ASME Reference"), filed with the Corrected Request for Inter Partes Reexamination of U.S. Patent No. 7,481,413, filed Jul. 10, 2009.

Appendix E: Chart Comparing Claims 1-16 of the '413 to the teachings of the U.S. Patent No. 1,912,937 Issued to George on Jun. 6, 1933, (the George Reference) filed with the Corrected Request for Inter Partes Reexamination of U.S. Patent No. 7,481,413, filed Jul. 10, 2009.

Appendix F: Chart Comparing Claims 1-16 of the '413 to the teachings of the George Reference in view of the American Society of Mechanical Engineers A112.19.14-2001 published Aug. 1, 2002), filed with the Corrected Request for Inter Partes Reexamination of U.S. Patent No. 7,481,413, filed Jul. 10, 2009.

Appendix G: Chart Comparing Claims 1-16 of the '413 to the teachings of the U.S. Patent No. 3,207,467 issued to Buhler on Aug., 5, 1963 ("the Buhler Reference"). filed with the Corrected Request for Inter Partes Reexamination of U.S. Patent No. 7,481,413, filed Jul. 10, 2009.

Appendix H: Chart Comparing Claims 1-16 of the '413 to the teachings of the Buhler Reference in view of the U.S. Patent No. 5,730,415 issued to Gronwick on Mar. 24, 1990 (the "Gronwick reference") and further in view of the American Society of Mechanical Engineers A112.19.14-2001 published Aug. 1, 2002 (the "ASME reference"); filed with the Corrected Request for Inter Partes Reexamination of U.S. Patent No. 7,481,413, filed Jul. 10, 2009.

First Office Action Issued by the U.S. Patent and Trademark Office on Aug. 21, 2009, for U.S. Appl. No. 95/001,187.

First Owner Reply to Office Action filed Oct. 21, 2009.

Comments Under 37 C.F.R. §1.947 by Third Party Requestor to Patent Owner's Response in Inter Partes Reexamination of U.S. Patent No. 7,481,413, filed Nov. 19, 2009.

Requestor Comments Appendix A: Chart Comparing Claims 1, 4-11, 14, and 16-71 of the '413 to the teachings of U.S. Patent No. 2,210,860 issued to Regnell in view of the U.S. Patent No. 5,730,415 issued to Gronwick on Mar. 24, 1990 and further in view of the American Society of Mechanical Engineers A112.19.14-2001 issued Aug. 1, 2002, filed with First Requester Comments on Nov. 19, 2009.

Requestor Comments Appendix B: Chart Comparing Claims 1, 4-11, 14, and 16-71 of the '413 to the teachings of the George Reference in view of the U.S. Patent No. 5,730,415 issued to Gronwick on Mar. 24, 1990 and further in view of the American Society of Mechanical Engineers A112.19.14-2001 issued Aug. 1, 2002 filed with First Requester Comments on Nov. 19, 2009.

Requestor Comments Appendix C: Chart Comparing Claims 1, 4-11, 14, and 16-71 of the '413 to the teachings of the Buhler Reference U.S. Pat. No. 3,207,467 in view of the U.S. Patent No. 5,730,415 issued to Gronwick on Mar. 24, 1990 (the "Gronwick reference") and further in view of the American Society of Mechanical Engineers A112.19.14-2001 published Aug. 1, 2002 (the "ASME reference"); filed with First Requester Comments on Nov. 19, 2009.

"Plaintiff Sloan Valve Company's Answer to Defendants Zurn Industries, Inc.'s and Zurn Industries, LLC's Second Amended Counterclaim", filed Aug. 12, 2010, 20 pages, United States District Court for the Northern District of Illinois, Eastern Division.

Defendants Zurn Industries, Inc and Zurn Industries, LLC's Second Amended Answer, Counterclaims, and Affirmative Defenses to Plaintiff Sloan Valve Company's Complaint, dated Jul. 20, 2010, 22 pages, United States District Court for the Northern District of Illinois, Eastern Division.

Pacer Docket Report for *Sloan Valve Co.* v. *Zurn Industries, Inc. et al.*, United States District Court for the Northern District of Illinois, Eastern Division, Case No. 1:10-cv-00204 as of Dec. 16, 2010.

Complaint, *Sloan Valve Co.* v. *Zurn Industries, Inc. et al.*, United States District Court for the Northern District of Illinois, Eastern Division, Case No. 1:10-cv-00204 Filed Jan. 13, 2010.

Answer, *Sloan Valve Co.* v. *Zurn Industries, Inc. et al.*, United States District Court for the Northern District of Illinois, Eastern Division, Case No. 1:10-cv-00204 Filed Feb. 8, 2010.

Motion To Dismiss, *Sloan Valve Co.* v. *Zurn Industries, Inc. et al.*, United States District Court for the Northern District of Illinois, Eastern Division, Case No. 1:10-cv-00204 Filed Feb. 23, 2010.

Memorandum By Sloan Valve Company In Support Of Motion To Dismiss, *Sloan Valve Co.* v. *Zurn Industries, Inc. et al.*, United States District Court for the Northern District of Illinois, Eastern Division, Case No. 1:10-cv-00204 Filed Feb. 23, 2010.

Memorandum In Opposition To Motion To Dismiss, *Sloan Valve Co.* v. *Zurn Industries, Inc. et al.*, United States District Court for the Northern District of Illinois, Eastern Division, Case No. 1:10-cv-00204 Filed Mar. 10, 2010.

Reply Memorandum In Support Of Motion To Dismiss, *Sloan Valve Co.* v. *Zurn Industries, Inc. et al.*, United States District Court for the Northern District of Illinois, Eastern Division, Case No. 1:10-cv-00204 Filed Mar. 17, 2010.

Motion To Bifurcate, *Sloan Valve Co.* v. *Zurn Industries, Inc. et al.*, United States District Court for the Northern District of Illinois, Eastern Division, Case No. 1:10-cv-00204 Filed Mar. 19, 2010.

Memorandum In Support Of Bifurcation, *Sloan Valve Co.* v. *Zurn Industries, Inc. et al.*, United States District Court for the Northern District of Illinois, Eastern Division, Case No. 1:10-cv-00204 Filed Mar. 19, 2010.

Memorandum In Opposition To Motion To Bifurcate, *Sloan Valve Co.* v. *Zurn Industries, Inc. et al.*, United States District Court for the Northern District of Illinois, Eastern Division, Case No. 1:10-cv-00204 Filed Apr. 8, 2010.

Reply Memorandum In Support Of Motion To Bifurcate, *Sloan Valve Co.* v. *Zurn Industries, Inc. et al.*, United States District Court for the Northern District of Illinois, Eastern Division, Case No. 1:10-cv-00204 Filed Apr. 19, 2010.

Amended Answer To Plaintiffs Complaint, *Sloan Valve Co.* v. *Zurn Industries, Inc. et al.*, United States District Court for the Northern District of Illinois, Eastern Division, Case No. 1:10-cv-00204 Filed May 18, 2010.

Answer To Amended Counterclaim, *Sloan Valve Co.* v. *Zurn Industries, Inc. et al.*, United States District Court for the Northern District of Illinois, Eastern Division, Case No. 1:10-cv-00204 Filed Jun. 8, 2010.

Second Amended Answer To Plaintiffs Complaint, *Sloan Valve Co.* v. *Zurn Industries, Inc. et al.*, United States District Court for the Northern District of Illinois, Eastern Division, Case No. 1:10-cv-00204 Filed Jul. 22, 2010.

Motion To Compel Discovery And To Award Sanctions, *Sloan Valve Co.* v. *Zurn Industries, Inc. et al.*, United States District Court for the Northern District of Illinois, Eastern Division, Case No. 1:10-cv-00204 Filed Jul. 23, 2010.

Memorandum In Support Of Motion To Compel, *Sloan Valve Co.* v. *Zurn Industries, Inc. et al.*, United States District Court for the Northern District of Illinois, Eastern Division, Case No. 1:10-cv-00204 Filed Jul. 23, 2010.

Answer To Counterclaim Second Amended Counterclaim, *Sloan Valve Co.* v. *Zurn Industries, Inc. et al.*, United States District Court for the Northern District of Illinois, Eastern Division, Case No. 1:10-cv-00204 Filed Aug. 12, 2010.

Motion For Sanctions, *Sloan Valve Co.* v. *Zurn Industries, Inc. et al.*; United States District Court for the Northern District of Illinois, Eastern Division, Case No. 1:10-cv-00204 Filed Sep. 20, 2010.

Memorandum In Support Of Motion For Sanctions, *Sloan Valve Co.* v. *Zurn Industries, Inc. et al.*, United States District Court for the Northern District of Illinois, Eastern Division, Case No. 1:10-cv-00204 Filed Sep. 20, 2010.

Motion To Stay, *Sloan Valve Co.* v. *Zurn Industries, Inc. et al.*, United States District Court for the Northern District of Illinois, Eastern Division, Case No. 1:10-cv-00204 Filed Sep. 20, 2010.

Memorandum In Support Of Motion To Stay, *Sloan Valve Co.* v. *Zurn Industries, Inc. et al.*, United States District Court for the Northern District of Illinois, Eastern Division, Case No. 1:10-cv-00204 Filed Sep. 20, 2010.
Memorandum In Opposition To Motion For Sanctions, *Sloan Valve Co.* v. *Zurn Industries, Inc. et al.*, United States District Court for the Northern District of Illinois, Eastern Division, Case No. 1:10-cv-00204 Filed Sep. 29, 2010.
Plaintiffs Motion For Partial Summary Judgment On Defendants' Invalidity Defenses And Zurn's Counterclaim For Invalidity Based On U.S. Patent No. 3,279,742 (Billeter).
Memorandum In Support Of Motion For Partial Summary Judgment, *Sloan Valve Co.* v *Zurn Industries, Inc et al.*, United States District Court for Northern Illinois, Eastern Division, Case No. 1:10-cv-00204 Filed Nov. 15, 2010.
Plaintiff's Rule 56.1(A)(3) Statement, *Sloan Valve Co.* v. *Zurn Industries, Inc. et al.*, United States District Court for the Northern District of Illinois, Eastern Division, Case No. 1:10-cv-00204 Filed Nov. 15, 2010.
Renewed Motion To Stay, *Sloan Valve Co.* v. *Zum Industries, Inc. et al.*, United States District Court for the Northern District of Illinois, Eastern Division, Case No. 1:10-cv-00204 Filed Dec. 8, 2010.
Memorandum In Support Of Motion To Stay, *Sloan Valve Co.* v. *Zurn Industries, Inc. et al.*, United States District Court for the Northern District of Illinois, Eastern Division, Case No. 1:10-cv-00204 Filed Dec. 8, 2010.
Plaintiffs Brief In Opposition To Renewed Motion To Stay, *Sloan Valve Co.* v. *Zurn Industries, Inc. et al.*, United States District Court for the Northern District of Illinois, Eastern Division, Case No. 1:10-cv-00204 Filed Dec. 15, 2010.
Motion For Leave To File Brief In Opposition, *Sloan Valve Co.* v. *Zurn Industries, Inc. et al.*, United States District Court for the Northern District of Illinois, Eastern Division, Case No. 1 :10-cv-00204 Filed Dec. 15, 2010.
Notice Of allowance For Mexican Patent Application No. PA/a/2006/009775, issued Feb. 8, 2010.
Response to Second Office Action for Mexican Patent Application No. PA/a/2006/009775, filed Nov. 9, 2009.
Second Office Action For Mexican Patent Application No. PA/a/2006/009775, dated Aug. 6, 2009.
Response to First Office Action for Mexican Patent Application No. PA/a/2006/009775, filed May 28, 2009.
First Office Action For Mexican Patent Application No. PA/a/2006/009775, dated Apr. 20, 2009.
Notice Of Allowance For Canadian Patent Application No. 2,557,102, issued Oct. 27, 2010.
Response To Second Office Action For Canadian Patent Application No. 2,557,102, filed Jul. 27, 2010, 5 pages.
Second Office Action For Canadian Patent Application No. 2,557,102 dated Jul. 15, 2010, 2 pages.
Response To First Office Action For Canadian Patent Application No. 2,557,102, filed Apr. 6, 2010, 7 pages.
First Office Action For Canadian Patent Application No. 2,557,102, dated Oct. 7, 2009, 2 pages.
Petition For Reinstatement And Amendment Of Canadian Patent Application No. 2,556,377, filed Jun. 3, 2010, 10 pages.
Voluntary Amendment And Response To Restriction Requirement For Canadian Patent Application No. 2,556,377, filed Apr. 6, 2010.
Restriction Requirement For Canadian Patent Application No. 2,556,377, issued Oct. 7, 2009.
Voluntary Amendment For Canadian Patent Application No. 2,556,377, filed Apr. 29, 2009.
Response To Office Action For Chinese Patent Application No. 200610121276 .0 filed May 12, 2010.
First Office Action For Chinese Patent Application No. 200610121276 .0, issued Jan. 22, 2010.
Response To Notification Relation To Unity Of Invention For Chinese Patent Application No. 200610121276.0, filed Jun. 11, 2009.
Notification Relation To Unity Of Invention For Chinese Patent Application No. 200610121276.0, issued Mar. 27, 2009.
Response to First Office Action For Mexican Patent Application No. PA/a/2006/009593, filed Oct. 1, 2010.

Voluntary Amendment For Mexican Patent Application No. PA/a/2006/009593, filed Oct. 24, 2008.
Voluntary Amendment For Chinese Patent Application No. 200910262261.X, filed Sep. 9, 2010.
Notification To Grant Patent For Chinese Patent Application No. 20061012128.1, issued Sep. 13, 2010.
ResponseTo Second Office Action For Chinese Patent Application No. 20061012128.1, filed Jun. 2, 2010.
Second Office Action For Chinese Patent Application No. 20061012128.1, issued Apr. 6, 2010.
Response To First Office Action For Chinese Patent Application No. 20061012128.1, filed Dec. 15, 2009.
First Office Action for Chinese Patent Application No. 20061012128.1, issued Jun. 19, 2009.
Response To Office Action For Chinese Patent Application No. 200780012750.9, filed Sep. 8, 2010.
Office Action for Chinese Patent Application No. 200780012750.9, issued May 11, 2010.
First Office Action for Canadian Patent Application No. 2,644,075, issued May 14, 2010.
Response To Office Action For Canadian Patent Application No. 2,557,102, filed Jul. 27, 2010.
First Office Action For Canadian Patent Application No. 2,557,102, issued Jul. 15, 2010.
Notification Of Provisional Rejection For Korean Patent Application No. 10-2008-7023167, issued Apr. 6, 2010.
Written Opinion Of The International Search Authority And International Search Report For PCT/US2007/004983, mailed Sep. 7, 2007.
International Preliminary Report On Patentability For PCT Application No. PCT/US2007/004983, issued Sep. 2, 2008.
Preliminary Amendment For U.S. Appl. No. 12/543,327, filed Feb. 9, 2010.
Notice Of Allowance for U.S. Patent Application No. 11/211,273, issued Jul. 9, 2009.
Response To Office Action For U.S. Appl. No. 11/211,273, filed Apr. 22, 2009.
First Office Action For U.S. Appl. No. 11/211,273, mailed Feb. 18, 2009.
Response To Restriction Requirement And Preliminary Amendment For U.S. Appl. No. 11/211,273, filed Jul. 17, 2008.
Restriction Requirement For U.S. Appl. No. 11/211,273, mailed Jul. 8, 2008.
Preliminary Amendment For U.S. Appl. No. 11/211,273, filed Apr. 7, 2006.
Plaintiff's Initial Infringement Contentions, *Valve Co.* v. *Zurn Industries, Inc. et al.*, United States District Court for the Northern District of Illinois, Eastern Division, Case No. 1:10-cv-00204, Dated Mar. 29, 2010, 11 pages.
Exhibit A: Plaintiff's Initial Infringement Contentions, *Valve Co.* v. *Zurn Industries, Inc. et al.*, United States District Court for the Northern District of Illinois, Eastern Division, Case No. 1:10-cv-00204, Dated Mar. 29, 2010, 103 pages.
Defendants' Initial Invalidity, Unenforceability and Non-Infringement Contentions, *Valve Co.* v. *Zurn Industries, Inc. et al.*, United States District Court for the Northern District of Illinois, Eastern Division, Case No. 1:10-cv-00204, Dated Apr. 16, 2010, 149 pages.
Defendants' Supplemental Initial Invalidity, Unenforceability and Non-Infringement Contentions, *Valve Co.* v. *Zurn Industries, Inc. et al.*, United States District Court for the Northern District of Illinois, Eastern Division, Case No. 1:10-cv-00204, Dated Apr. 26, 2010, 222 pages.
Defendants' Corrected Second Supplemental Initial Invalidity, Unenforceability and Non-Infringement Contentions, *Valve Co.* v. *Zurn Industries, Inc. et al.*, United States District Court For the Northern District of Illinois, Eastern Division, Case No. 1:10-cv-00204, Dated May 14, 2010, 360 pages.
Exhibit A: Defendants' Corrected Second Supplemental Initial Invalidity, Unenforceability and Non-.Infringement Contentions, *Valve Co.* v. *Zurn Industries, Inc. et al.*, United States District Court for the Northern District of Illinois, Eastern Division, Case No. 1:10-cv-00204, Dated May 14, 2010, 5 pages.
Exhibit B: Defendants' Corrected Second Supplemental Initial Invalidity, Unenforceability and Non-Infringement Contentions, *Valve*

*Co.* v. *Zurn Industries, Inc. et al.*, United States District Court for the Northern District of Illinois, Eastern Division, Case No. 1:10-cv-00204, Dated May 14, 2010, 7 pages.

Plaintiff Sloan Valve Company's Responses to Defendants' Second Supplemental Invalidity Contentions, Valve Infringement Contentions, *Valve Co.* v. *Zurn Industries, Inc. et al.*, United States District Court for the Northern District of Illinois, Eastern Division, Case No. 1:10-cv-00204, Dated May 14, 2010, 7 pages.

Defendants' Supplemental Invalidity Contentions Under 35 U.S.C. § 112 and Non-Infringement Contentions, *Valve Co.* v. *Zurn Industries, Inc. et al.*, United States District Court for the Northern District of Illinois, Eastern Division, Case No. 1:10-cv-00204, Dated Jun. 11, 2010, 40 pages.

Defendants' Responses to Plaintiff's Interrogatories 11-13, *Sloan Valve Co.* v. *Zurn Industries, Inc. et al.*, United States District Court for the Northern District of Illinois, Eastern Division, Case No. 1:10-cv-00204, Dated Jun. 25, 2010, 5 pages.

Plaintiff's Supplemental Responses to Defendants' First Set of Interrogatories, *Sloan Valve Co.* v. *Zurn Industries, Inc. et al.*, United States District Court for the Northern District of Illinois, Eastern Division, Case No. 1:10-cv-00204, Dated Jul. 9, 2010, 47 pages.

Defendants' Third Supplemental Responses to Plaintiff's Interrogatories Nos. 1-10, *Sloan Valve Co.* v. *Zurn Industries, Inc. et al.*, United States District Court for the Northern District of Illinois, Eastern Division, Case No. 1:10-cv-00204, Dated Jul. 9, 2010, 12 pages.

Defendants' Response to Plaintiff's Interrogatory No. 14, *Sloan Valve Co.* v. *Zurn Industries, Inc. et al.*, United States District Court for the Northern District of Illinois, Eastern Division, Case No. 1:10-cv-00204, Aug. 4, 2010, 4 pages.

Plaintiff's Responses to Defendants' Interrogatories Nos. 11-13, *Sloan Valve Co.* v. *Zurn Industries, Inc. et al.*, United States District Court for the Northern District of Illinois, Eastern Division, Case No. 1:10-cv-00204, Dated Sep. 24, 2010, 14 pages.

Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 11 pages.

Exhibit A: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 35 pages.

Exhibit B: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 57 pages.

Exhibit C: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 42 pages.

Exhibit D: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 12 pages.

Exhibit E: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 24 pages.

Exhibit F: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 23 pages.

Exhibit G: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 76 pages.

Appendix 1: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv00204, Dated Oct. 22, 2010, 14 pages.

Appendix 2: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 5 pages.

Appendix 3: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 25 pages.

Appendix 4: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 25 pages.

Appendix 5: Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 25 pages Defendants' Final Invalidity and Unenforceability Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 25 pages Plaintiffs Final Infringement Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 16 pages.

Exhibit A: Plaintiff's Final Infringement Contentions, *Sloan Valve Co.* v. *Zurn Industries, Inc. et al.*, United States District Court for the Northern District of Illinois, Eastern Division, Case No. 1:10-cv-00204, Dated Oct. 22, 2010, 131 pages.

Defendants' Final Non-Infringement Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 32 pages.

Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 4 pages.

Exhibit A: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 20 pages.

Exhibit B: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 35 pages.

Exhibit C: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1: 10-cv-00204, Dated Nov. 22, 2010, 23 pages.

Exhibit D: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 21 pages.

Exhibit E: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 29 pages.

Exhibit F: Plaintiff Sloan Valve Company's Responses to Defendants' Final Invalidity Contentions, Sloan Valve Co. v. Zurn Industries, Inc. et al., United States District Court for the Northern District of Illinois, Eastern Division, Case No. 1:10-cv-00204, Dated Nov. 22, 2010, 23 pp.

Exhibit G: Plaintiff Sloan Valve Company's Responses to Defendants' Final Invalidity Contentions, *Sloan Valve Co.* v. *Zurn Industries, Inc. et al.*, United States District Court for the Northern District of Illinois, Eastern Division, Case No. 1:10-cv-00204, Dated Nov. 22, 2010, 56 pages.

Plaintiffs Proposed Claim Construction Pursuant to L.P.R. 4.1, *Valve Co.* v. *Zurn Industries, Inc. et al.*, United States District Court for the Northern District of Illinois, Eastern Division, Case No. 1:10-cv-00204, Dated Dec. 6, 2010, 3 pages.

Defendants' Proposed Claim Terms to be Construed and Proposed Constructions, *Valve Co. v. Zurn Industries, Inc. et al.*, United States District Court for the Northern District of Illinois, Eastern Division, Case No. 1:10-cv-00204, Dated Dec. 6, 2010, 6 pages.
First Office Action for U.S. Appl. No. 12/353,569, issued May 17, 2010, 24 pages.
Owners response to First Office Action for U.S. Appl. No. 12/353,569, filed Oct. 26, 2010, 25 pages.
Response to Patent Office Communication regarding Defects and Request for Re-Examination of US Patent No. 7,481,413 filed Jul. 10, 2009, 3 pages.
Declaration under 35 C.F.R.§ 1.132 by Mr. Michael Funari for U.S. Appl. No. 95/001,187, Executed Oct. 20, 2009, Exhibit A, 5 Pages.
Request for Ex Parte Re-Examination of U.S. Patent No. 7,607,635, filed Sep. 17, 2010.
U.S. Appl. No. 60/579,398, filed Jun. 14, 2004, Funari.
U.S. Appl. No. 95/001,187, filed Jul. 10, 2004, Funari.
Restriction/election requirement Issued For U.S. Appl. No. 11/711,391, Issued Jun. 24, 2009.
Response to Restriction Requirement For U.S. Appl. No. 11/711,391, Filed Jul. 23, 2009.
Office Action Issued For U.S. Appl. No. 11/711,391, Issued Oct. 28, 2009.
Respone to Office Action For U.S. Appl. No. 11/711,391, Filed Jan. 28, 2010.
Notice of Allowance For U.S. Appl. No. 11/711,391, Issued May 26, 2010.
Notice of Allowance For U.S. Appl. No. 11/711,391, Issued Sep. 17, 2010.
Request For Continued Application of U.S. Appl. No. 11/711,391, Filed Aug. 25, 2010.
Request For Continued Application of U.S. Appl. No. 11/711,391, Filed Dec. 17, 2010.
Japanese Patent Documents Produced During Discovery by Defendants Zurn Industries, Inc. and Zurn Industries, LLC, *Sloan Valve Co. v. Zurn Industries, Inc. et al.*, United States District Court for the Northern District of Illinois, Eastern Division, Case No. 1:10-cv-00204. No English translations were provided by Defendants.
Deposition Transcript Of Mr. Matthew Martin, *Sloan Valve Co. v. Zurn Industries, Inc. et al.*, United States District Court For the Northern District of Illinois, Eastern Division, Case No. 1:10-cv-002074, Dated Aug. 11, 2010.
Deposition Transcript Of Mr. Michael Rechtin, *Sloan Valve Co.v. Zurn Industries, et al.*, United States District Court For the Northern District of Illinois, Eastern Division, Case No. 1:10-cv-00204, Dated Aug. 12, 2010.
Deposition Transcript Of Mr. Joel Bock, *Sloan Valve Co. v. Zurn Industries, Inc. et al.*, United States District Court for the Northern District of Illinois, Eastern Division, Case No. 1:10-cv-00204, Dated Aug. 13, 2010.
Deposition Transcript Of Mr. Peter Jahrling, *Sloan Valve Co. v. Zurn Industries, Inc. et al.*, United States District Court for the Northern District of Illinois, Eastern Division, Case No. 1:10-cv-00204, Dated Oct. 11, 2010.
Deposition Transcript Of Mr. Mark Gutting-Kilzer, *Sloan Valve Co. v. Zum Industries, Inc. et al.*, United States District Court for the Northern District of Illinois, Eastern Division, Case No. 1:10-cv-00204, Dated Oct. 12, 2010.
Deposition Transcript Of Mr. Daniel Carroll, *Sloan Valve Co. v. Zum Industries, Inc. et al.*, United States District Court for the Northern District of Illinois, Eastern Division, Case No. 1:10-cv-00204, Dated Oct. 13, 2010.
Deposition Transcript Of Mr. John Wilson, *Sloan Valve Co. v. Zum Industries, Inc. et al.*, United States District Court for the Northern District of Illinois, Eastern Division, Case No. 1:10-cv-00204, Dated Oct. 14, 2010.
Deposition Transcript Of Ms. Julie Shireman, *Sloan Valve Co. v. Zum Industries, Inc. et al.*, United States District Court for the Northern District of Illinois, Eastern Division, Case No. 1:10-cv-00204, Dated Oct. 15, 2010.
Zurn Internal Email ZP002716, "Sloan Helps reduce Operating Costs," Dated May 24, 2005, Document confidential, but released pursuant to De-designation Letter From The Webb Law Firm dated Dec. 29, 2010. De-designation Letter From The Webb Law Firm releasing Confidential Documents, Dated Dec. 29, 2010.
Six-Liter Water Closets Equipped With a Dual Flushing Device, American Society of Mechanical Engineers, ASME A112.19.14-2006 Published Jul. 10, 2006.
"Dual Flush Devices For Water Closets," American Society of Mechanical Engineers, ASME A112.19.Oct. 2003, Published Jul. 15, 2003.
"Dual Flush Devices For Water Closets," American Society of Mechanical Engineers, ASME A112.19.Oct. 1994, Published 1994.
"Pressurized Flushing Devices (Flushometers) for Plumbing Fixtures," American Society of Sanitary Engineering, Asse Standard #1037, Published Mar. 1990.
Defendants' responses to plaintiffs requests for admission Nos. 1-12, *Sloan Valve Co. v. Zurn Industries, Inc. et al.*, United States District Court for the Northern District of Illinois, Eastern Division, Case No. 1:10-cv-00204, Dated Apr. 22, 2010.
Defendants' Response to Plaintiffs Request for Production of Documents and Things Nos. 1-30, *Sloan Valve Co. v. Zurn Industries, Inc. et al.*, United States District Court for the Northern District of . Illinois, Eastern Division, Case No. 1:10-cv-00204, Dated Apr. 28, 2010.
Defendants' Responses to Plaintiffs Requests for Admission Nos. 13-28, *Sloan Valve Co. v. Zum Industries, Inc. et al.*, United States District Court for the Northern District of Illinois, Eastern Division, Case No. 1:10-cv-00204, Dated May 25, 2010.
Defendants' Supplemental Responses to Plaintiffs Request for Production of Documents and Things Nos. 1-30, *Sloan Valve Co. v. Zurn Industries, Inc. et al.*, United States District Court for the Northern District of Illinois, Eastern Division, Case No. 1:10-cv-00204, Dated May 26, 2010.
Defendants' Supplemental Responses to Plaintiffs Requests for Admission Nos. 1-12, *Sloan Valve Co. v. Zum Industries, Inc. et al.*, United States District Court for the Northern District of Illinois, Eastern Division, Case No. 1:10-cv-00204, Dated May 26, 2010.
Defendants' Responses to Plaintiffs Requests for Admission Nos. 29-34, *Sloan Valve Co. v. Zum Industries, Inc. et al.*, United States District Court for the Northern District of Illinois, Eastern Division, Case No. 1:10-cv-00204, Dated Jun. 2, 2010.
Plaintiff's Responses to Defendants' First Requests for Production of Documents and Things, *Sloan Valve Co. v. Zum Industries, Inc. et al.*, United States District Court for the Northern District of Illinois, Eastern Division, Case No. 1:10-cv-00204, Dated Jun. 4, 2010.
Plaintiff's Responses to Defendants' First Set of Requests for Admission, *Sloan Valve Co. v. Zurn Industries, Inc. et al.*, United States District Court for the Northern District of Illinois, Eastern Division, Case No. 1:10-cv-00204, Dated Jun. 9, 2010.
Defendants' Corrected Responses to Plaintiffs Requests for Admission Nos. 35-37, *Sloan Valve Co. v. Zum Industries, Inc. et al.*, United States District Court for the Northern District of Illinois, Eastern Division, Case No. 1:10-cv-00204, Dated Jun. 18, 2010.
Defendants' Responses to Plaintiffs Requests for Production of Documents and Things Nos. 31-48, *Sloan Valve Co. v. Zurn Industries, Inc. et al.*, United States District Court for the Northern District of Illinois, Eastern Division, Case No. 1:10-cv-00204, Dated Jun. 29, 2010.
Defendants' First Supplemental Responses to Plaintiffs Interrogatories Nos. 11-13, *Sloan Valve Co. v. Zum Industries, Inc. et al.*, United States District Court for the Northern District of Illinois, Eastern Division, Case No. 1:10-cv-00204, Dated Jul. 9, 2010.
Defendants' Supplemental Response to Plaintiffs Interrogatory No. 1, *Sloan Valve Co. v. Zum Industries, Inc. et al.*, United States District Court for the Northern District of Illinois, Eastern Division, Case No. 1:10-cv-00204, Dated Aug. 12, 2010.
Defendants' Supplemental Responses to Plaintiffs Interrogatory Nos. 1 and 5, *Sloan Valve Co. v. Zum Industries, Inc. et al.*, United States District Court for the Northern District of Illinois, Eastern Division, Case No. 1:10-cv-00204, Dated Aug. 27, 2010.
Defendants' Supplemental Responses to Plaintiffs Requests for Production of Documents and Things Nos. 49-55, *Sloan Valve Co. v. Zum Industries, Inc. et al.*, United States District Court for the Northern District of Illinois, Eastern Division, Case No. 1:10-cv-00204, Dated Aug. 27, 2010.

Defendants' Responses to Plaintiffs Requests for Production of Documents and Things Nos. 58-61, *Sloan Valve Co. v. Zum Industries, Inc. et al.*, United States District Court for the Northern District of Illinois, Eastern Division, Case No. 1:10-cv-00204, Dated Aug. 31, 2010.

Defendants' Supplemental Response to Plaintiffs Interrogatory No. 1, *Sloan Valve Co. v. Zurn Industries, Inc. et al.*, United States District Court for the Northern District of Illinois, Eastern Division, Case No. 1:10-cv-00204, Dated Sep. 1, 2010.

Plaintiffs Responses to Defendants' Second Set of Requests for Production of Documents and Things, *Sloan Valve Co. v. Zurn Industries, Inc. et al.*, United States District Court for the Northern District of Illinois, Eastern Division, Case No. 1:10-cv-00204, Dated Nov. 1, 2010.

Exhibits 1-19 to deposition of Matthew Martin, *Sloan Valve Co. v. Zurn Industries, Inc. et al.*, United States District Court for the Northern District of Illinois, Eastern Division, Case No. 1:10-cv-00204, Dated Aug. 12, 2010. Note: some exhibits have been redacted for confidentiality and are being submitted in a separate information Disclosure Statement pursuant to MPEP § 724.

Exhibits 20-26 to deposition of Michael Rechtin, *Sloan Valve Co. v. Zurn Industries, Inc. et al.*, United States District Court for the Northern District of Illinois, Eastern Division, Case No. 1:10-cv-00204, Dated Aug. 12, 2010. Note: some exhibits have been redacted for confidentiality and are being submitted in a separate information Disclosure Statement pursuant to MPEP § 724.

Exhibits 27-34 to deposition of Joel Bock, *Sloan Valve Co. v. Zurn Industries, Inc. et al.*, United States District Court for the Northern District of Illinois, Eastern Division, Case No. 1:10-cv-00204, Dated Aug. 13, 2010. Note: some exhibits have been redacted for confidentiality and are being submitted in a separate information Disclosure Statement pursuant to MPEP § 724.

Exhibits 35-53 to deposition of Peter Jahrling, *Sloan Valve Co. v. Zurn Industries, Inc. et al.*, United States District Court for the Northern District of Illinois, Eastern Division, Case No. 1:10-cv-00204, Dated Oct. 11, 2010. Note: some exhibits have been redacted for confidentiality and are being submitted in a separate information Disclosure Statement pursuant to MPEP § 724.

Exhibits 54-65 to deposition of Mark Gutting-Kilzer, *Sloan Valve Co. v. Zurn Industries, Inc. et al.*, United States District Court for the Northern District of Illinois, Eastern Division, Case No. 1:10-cv-00204, Dated Oct. 12, 2010. Note: some exhibits have been redacted for confidentiality and are being submitted in a separate Information Disclosure Statement pursuant to MPEP § 724.

Exhibits 66-71 to deposition of Daniel Carroll, *Sloan Valve Co.v. Zurn Industries, Inc. et al.*, United States District Court for the Northern District of Illinois, Eastern Division, Case No. 1:10-cv.00204, Dated Oct. 13, 2010. Note: some exhibits have been redacted for confidentiality and are being submitted in a separate Information Disclosure Statement pursuant to MPEP § 724.

Exhibits 72-88 to deposition John Wilson, *Sloan Valve Co. v. Zurn Industries, Inc. et al.*, United States District Court for the Northern District of Illinois, Eastern Division, Case No. 1:10-cv-00204, Dated Oct. 14, 2010. Note: some exhibits have been redacted for confidentiality and are being submitted in a separate Information Disclosure Statement pursuant to MPEP § 724.

Exhibits 89-108 to Deposition Julie Shireman, *Sloan Valve Co. v. Zurn Industries, Inc. et al.*, United States District Court for the Northern District of Illinois, Eastern Division, Case No. 1:10-cv-00204, Dated Oct. 15, 2010. Note: some exhibits have been redacted for confidentiality and are being submitted in a separate Information Disclosure Statement pursuant to MPEP § 724.

Exhibits 109-143 to deposition Jim Allen, *Sloan Valve Co. v. Zurn Industries, Inc. et al.*, United States District Court for the Northern District of Illinois, Eastern Division, Case No. 1:10-cv-00204, Dated Nov. 12, 2010. Note: some exhibits have been redacted for confidentiality and are being submitted in a separate Information Disclosure Statement pursuant to MPEP § 724.

Photographs of Coyne & Delany foot-activated "Flushboy" flush valve taken on Apr. 21, 2010, Bates number SVC0011766-SVC0011798, manufactured by Coyne & Delany Products, Charlottesville, Virginia, alleged to be prior art by Defendants, date of manufacture unknown, *Sloan Valve Co. v. Zurn Industries, Inc. et al.*, United States District Court for the Northern District of Illinois, Eastern Division, Case No. 1:10-cv-00204.

Photographs of Sloan long flush valve handle (handle mislabeled in photograph as worn Zurn flush valve) taken on Apr. 21, 2010, Bates number SVC0011799-SVC0011818, *Sloan Valve Co. v. Zurn Industries, Inc. et al.*, United States District Court for the Northern District of Illinois, Eastern Division, Case No. 1:10-cv-00204.

Photographs of Sloan short flush valve handle taken on Apr. 21, 2010, Bates No. SVC0011819-SVC0011843, *Sloan Valve Co. v. Zurn Industries, Inc. et al.*, United States District Court for the Northern District of Illinois, Eastern Division, Case No. 1:10-cv-00204.

Photographs of simulated worn Zurn flush valve handle with brass bushing, created by Zum circa 2008- 2009, Bates No. SVC0011844-SVC0011881, *Sloan Valve Co. v. Zurn Industries, Inc. et al.*, United States District Court for the Northern District of Illinois, Eastern Division, Case No. 1:10-cv-00204.

Photographs of new Zurn flush valve handle with brass bushing taken On Apr. 21, 2010, Bates number SVC0011882-SVC0011891, *Sloan valve Co. v. Zurn Industries, Inc. et al.*, United States District Court for the Northern District of Illinois, Easten Division, Case No. 1:10-cv-00204.

Photographs of new Zurn flush valve handle with brass bushing taken on Apr. 21, 2010, Bates number SVC0011892-SVC0011898, *Sloan valve Co. v. Zurn Industries, Inc. et al.*, United States District Court for the Northern District of Illinois, Easten Division, Case No. 1:10-cv-00204.

Photographs comparing Sloan short flush valve handle to Sloan long flush valve handle taken on Apr. 21, 2010, Bates number SVC0011763, *Sloan valve Co. v. Zurn Industries, Inc. et al.*, United States District Court for the Northern District of Illinois, Easten Division, Case No. 1:10-cv-00204.

Photographs showing side-by-side comparison of "worn Zurn flush valve handle with brass bushing" to "new Zurn flush valve handle with plastic busing" and "new Zurn flush valve handle with brass bushing" taken Apr. 21, 2010, Bates number SVC0011760-SVC0011762, SVC0011764 and SVC0011765 *Sloan Valve co. v. Zurn Industries, Inc. et al.*, United States District Court for the Northern District of Illinois, Eastern Division, Case No. 1:10-cv-00204.

Photographs of alleged prior art flush valve ("Billeter") producted by Defendant, *Sloan Valve Co. v. Zurn Industries, Inc. et al.*, United States District Court for the Northern District of Illinois, Easten Division, Case No. 1:10-cv-00204.

Photographs of Zurn products taken by Sloan expert, Bates numbers SVC0318103-SVC0318121, SVC0318130-SVC0318146, SVC318148-SVC0318173, *Sloan Valve Co. v. Zurn Industries, Inc. et al.*, United States District Court for the Northern District of Illinois, Easten Division, Case No. 1:10-cv-00204.

Order regarding Sloan's Motion to Dismiss, *Sloan Valve Co. v. Zurn Industries, Inc. et al.*, 712 F. Supp. 2d 743 (N. D. III. 2010), May 6, 2010, *Sloan Valve Co. v. Zum Industries, Inc. et al.*, United States Court for the Northern District of Illinois, Eastern Division, Case No. 1:10-cv-00204.

Zurn's Amendment and Request for Interference Under 37 C.F.R. 41.202, Filed Oct. 26, 2010.

Video of Sloan expert's inspection and flush vol. testing of Zum worn flush valve, Dated Dec. 9, 2010, Bates No. SVC0318206, *Sloan Valve Co. v. Zurn Industries, Inc. et al.*, United States District Court for the Northern District of Illinois, Eastern Division, Case No. 1:10-cv-00204.

Coordinate measuring machine rendering of Zurn worn flush valve bushing bore performed by Sloan expert, Dated Dec. 9, 2010, Bates No. SVC0318174, *Sloan Valve Co. v. Zurn Industries, Inc. et. al.*, United States District Court for the Northern District of Illinois, Eastern Division, Case No. 1:10-cv00204.

Notes from Sloan expert's inspection and flush volume testing of Zum worn flush valve, Dated.Dec. 9, 2010, Bates No. SVC0318175, *Sloan Valve Co. v. Zurn Industries, Inc. et al.*, United States District Court for the Northern District of Illinois, Eastern Division, Case No. 1:10-cv-00204.

Photographs from Sloan expert's inspection and replication of Zum worn flush valve bushing bore, Dated Feb. 16-18, 2011, Bates Nos. SVC0318183-SVC0318205, *Sloan Valve Co. v. Zurn Industries, Inc.*

*et al.*, United States District Court for the Northern District of Illinois, Eastern Division, Case No. 1:10-cv-00204.

Office Action for Chinese Patent Application No. 200910262261.X, issued Apr. 8, 2011.

Confidential exhibits to Rule 30(b)(6) deposition of Allen Becker, Dated Sep. 28, 2010, *Sloan Valve Co. v. Zurn Industries, Inc. et al.*, United States District Court for the Northern District of Illinois, Eastern Division, Case No. 1:10-cv-00204.

Confidential transcript of Rule 30(a)(1) deposition of James Bauer, Dated Nov. 18, 2010, *Sloan Valve Co. v. Zurn Industries, Inc. et al.*, United States District Court for the Northern District of Illinois, Eastern Division, Case No. 1:10-cv-00204.

Confidential exhibits to Rule 30(a)(1) deposition of James Bauer, Dated Nov. 18, 2010, Sloan Illinois, Eastern Division, Case No. 1:10-cv-00204.

Confidential exhibits to Rule 30(a)(1) deposition of Joseph Ballachino, Dated Nov. 19, 2010, *Sloan Valve Co. v. Zurn Industries, Inc. et al.*, United States District Court for the Northern District of Illinois, Eastern Division, Case No. 1:10-cv-00204.

Confidential transcript of Rule 30(a)(1) deposition of Joseph Ballachino, Dated Nov. 19, 2010, *Sloan Valve Co. v. Zurn Industries, Inc. et al.*, United States District Court for the Northern District of Illinois, Eastern Division, Case No. 1:10-cv-00204.

Confidential transcript of Rule 30(b)(6) deposition of Donald Kubiak, Dated Dec. 9, 2010, *Sloan Valve Co. v. Zurn Industries, Inc. et al.*, United States District Court for the Northern District of Illinois, Eastern Division, Case No. 1:10-cv-00204.

Zurn engineering drawing 200090 cited in Defendants' Corrected Second Supplemental Initial Invalidity, UnenForceability and Non-Infringement Contentions, Dated May 14, 2010, Zurn Bates No.ZP000037, p. 38, *Sloan Valve Co. v. Zurn Industries, Inc. et al.*, United States District Court for the Northern District of Illinois, Eastern Division, Case No. 1:10-cv-00204.

Photographs of Coyne & Delany foot-activated "Flushboy" flush valve cited in Defendants' Corrected Second Supplemental Initial Invalidity, UnenForceability and Non-Infringement Contentions, Dated May 14, 2010, Zurn Bates Nos. ZP000038 - ZP000057, p. 196, *Sloan Valve Co. v. Zurn Industries, Inc. et al.*, United States District Court for the Northern District of Illinois, Eastern Division, Case No. 1:10- cv-00204.

Photographs of new Zurn flush valve handle with brass bushing cited in Defendants' Corrected Second Supplemental Initial Invalidity, UnenForceability and Non-Infringement Contentions, Dated May 14, 2010, Zurn Bates Nos. ZP000062 - ZP000067, p. 2, *Sloan Valve Co. v. Zurn Industries, Inc. et al.*, United States District Court for the Northern District of Illinois, Eastern Division, Case No. 1:10-cv00204.

Photographs of worn Zurn flush valve handle with brass bushing cited in Defendants' Corrected Second Supplemental Initial Invalidity, UnenForceability and Non-Infringement Contentions, Dated May 14, 2010, Zurn Bates Nos. ZP000068 - ZP000072, p. 38, *Sloan Valve Co. v. Zurn Industries, Inc.al.*, United States District Court for the Northern District of Illinois, Eastern Division, Case No. 1:10-cv00204.

Photographs of new Zurn flush valve handle with plastic bushing cited in Defendants' Corrected Second Supplemental Initial Invalidity, UnenForceability and Non-Infringement Contentions, Dated May 14, 2010, Zurn Bates Nos. ZP000073-ZP000076, p. 2, *Sloan Valve Co. v. Zurn Industries, Inc.al.*, United States District Court for the Northern District of Illinois, Eastern Division, Case No. 1:10-cv00204.

Photographs of Sloan long flush valve handle cited in Defendants' Corrected Second Supplemental Initial Invalidity, UnenForceability and Non-Infringement Contentions, Dated May 14, 2010, Zurn Bates Nos. ZP000077-ZP000081, p. 89, *Sloan Valve Co. v. Zurn Industries, Inc. et al.*, United States District Court for the Northern District of Illinois, Eastern Division, Case No. 1:10-cv-00204.

Photographs of Sloan short flush valve handle cited in Defendants' Corrected Second Supplemental Initial Invalidity, UnenForceability and Non-Infringement Contentions, Dated May 14, 2010, Zurn Bates Nos. ZP000082-ZP000086, p. 138, *Sloan Valve Co. v. Zurn Industries, Inc. et. al.*, United States District Court for the Northern District of Illinois, Eastern Division, Case No. 1:10-cv-00204. T Transcript of Michael Funari Deposition, Dated Dec. 2, 2010, pp. 1-11 and 65-95, *Sloan Valve Co. v. Zurn Industries, Inc. et al.*, United States District Court for the Northern District of Illinois, Eastern Division, Case No. 1:10-cv-00204.

Exhibits 106-111 to Plaintiff Sloan Valve Company's Deposition of Michael Funari, Dated Dec. 2, 2010, *Sloan Valve Co. v. Zurn Industries, Inc. et al.*, United States District Court for the Northern District of Illinois, Eastern Division, Case No. 1:10-cv-00204.

Photographs of Zurn Australian dual flush valve relating to Plaintiff Sloan Valve Company's Deposition of Michael Funari, Held on Dec. 2, 2010, Bates Nos. SVC0317815-SVC0317819, p. 82, *Sloan Valve Co. v. Zurn Industries, Inc. et al.*, United States District Court for the Northern District of Illinois, Eastern Division, Case No. 1:10-cv-00204.

Transcript of 30(b)(6) Deposition (Worn Valve) of Michael Funari, Dated Dec. 16, 2010, pp. 1-85 and 90-109, *Sloan Valve Co. v. Zurn Industries, Inc. et al.*, United States District Court for the Northern District of Illinois, Eastern Division, Case No. 1:10-cv-00204.

Exhibits 250-55 and 262 to Plaintiff Sloan Valve Company's Deposition of Michael Funari, Dated Dec. 16, 2010, *Sloan Valve Co. v. Zurn Industries, Inc. et al.*, United States District Court for the Northern District of Illinois, Eastern Division, Case No. 1:10-cv-00204.

Photographs of Zurn handle life testing relating to Exhibits 250-253 and 262 to Plaintiff Sloan Valve Company's Deposition of Michael Funari, Held on Dec. 16, 2010, Bates No. SVC0317805-SVC0317814 and SVC0317612-SVC0317660, pp. 7, 47, 58, 64, and 102, *Sloan Valve Co. v. Zurn Industries, Inc. et al.*, United States District Court for the Northern District of Illinois, Eastern Division, Case No. 1:10-cv-00204.

Photographs of Zurn's manufactured worn bushings relating to Plaintiff Sloan Valve Company's Deposition of Michael Funari, Held on Dec. 16, 2010, Bates Nos. SVC0317670-SVC0317671 and SVC0317827-SVC0317830, pp. 32, 42, *Sloan Valve Co. v. Zurn Industries, Inc. et al.*, United States District Court for the Northern District of Illinois, Eastern Division, Case No. 1:10-cv-00204.

Drawings relating to U.S. Patent No. 3,279,742 ("Billeter"), Bates Nos. SVC0317839-SVC0317841, *Sloan Valve Co. v. Zurn Industries, Inc. et al.*, United States District Court for the Northern District of Illinois, Eastern Division, Case No. 1:10-cv-00204.

"EX 500 Flush Valve Study," Bates Nos. SVC0317842-SVC0317886, *Sloan Valve Co. v. Zurn Industries, Inc. et al.*, United States District Court for the Northern District of Illinois, Eastern Division, Case No. 1:10-cv-00204.

Confidential Exhibits to Deposition of Matthew Martin, United States District Court for the Northern District of Illinois, Eastern Division, Case No. 1:10-cv-00204, Dated Aug. 11, 2010.

Confidential Exhibits to Deposition of Michael Rechtin, United States District Court for the Northern District of Illinois, Eastern Division, Case No. 1:10-cv-00204, Dated Aug. 12, 2010.

Confidential Exhibits to Deposition of Joel Bock, United States District Court for the Northern District of Illinois, Eastern Division, Case No. 1:10-cv-00204, Dated Aug. 13, 2010.

Confidential Exhibits to Deposition of Peter Jahrling, United States District Court for the Northern District of Illinois, Eastern Division, Case No. 1:10-cv-00204, Dated Oct. 11, 2010.

Confidential Exhibits to Deposition of Mark Gutting-Kilzer, United States District Court for the Northern District of Illinois, Eastern Division, Case No. 1:10-cv-00204, Dated Oct. 12, 2010.

Confidential Exhibits to Deposition of Daniel Carroll, United States District Court for the Northern District of Illinois, Eastern Division, Case No. 1:10-cv-00204, Dated Oct. 13, 2010.

Confidential Exhibits to Deposition of John Wilson, United States District Court for the Northern District of Illinois, Eastern Division, Case No. 1:10-cv-00204, Dated Oct. 14, 2010.

Confidential Exhibits to Deposition of Julie Shireman, United States District Court for the Northern District of Illinois, Eastern Division, Case No. 1:10-cv-00204, Dated Oct. 15, 2010.

Deposition Transcript of Mr. Jim Allen, *Sloan Valve Co. v. Zurn Industries, Inc. et al.*, United States District Court for the Northern District of Illinois, Eastern Division, Case No. 1:10-cv-00204, Dated Nov. 12, 2010.

Confidential Exhibits to Deposition of Jim Allen, United States District Court for the Northern District of Illinois, Eastern Division, Case No. 1:10-cv-00204, Dated Nov. 12, 2010.

Photograph of Worn Zurn Flush Valve Handle with Brass Bushing, Plaintiff Deposition Exhibits No. 51, Bates No. ZP000070.

Photograph of Brass Bushing for Zurn Flush Valve Handle, Plaintiff Deposition Exhibits No. 52.

Report of Preliminary Flush Volume Tests Conducted by Zum on Two Sloan Dual Flush Handles and One Sloan Single Flush Handle, Plaintiff Deposition Exhibits No. 134, Dated Nov. 30, 2005 According to Zurn.

* cited by examiner

US 8,042,787 B2

DUAL FLUSH ACTIVATION

CROSS REFERENCE TO RELATED APPLICATION

This application claims priority from U.S. Provisional Patent Applications 60/776,993 filed Feb. 27, 2006 and 60/849,042 filed Oct. 3, 2006, herein incorporated by reference in its entirety.

BACKGROUND OF THE INVENTION

The present invention relates generally to the field of flush valves in general. More particularly, the present invention relates to dual flush volume flush valves.

Flush valves are used to selectively control the flushing of a urinal or toilet with a certain volume of water. Typically, flush valves include a flexible diaphragm with forms a seal between the inlet and outlet, whereby a disruption of the diaphragm will result in a flow of water into the urinal or toilet. This disruption controls the volume of the flush, and is generally fixed.

Commercial toilets and urinals have traditionally utilized a single flush volume in their operations. This flush volume is designed to provide the maximum amount of water needed that may be needed to clear solid waste products. However, solid waste and liquid waste require different volumes of water. In a single flush system, the higher volume of water necessary to flush solid waste is also used to flush liquid waste, with the result that more water than is necessary is often used. There is a need for a dual flush volume toilet which allows for the use of a lower volume of water when a full volume is not needed to clear waste.

Some prior art flush valves provide for a dual flush. However, such prior art dual flush mechanisms typically rely on modifying the action of the flush handle. This presents a user with a non-standard flushing experience and lessens the likelihood of proper usage.

Due to the ubiquitous nature of urinals and toilets, their operation has become an afterthought for most users. Therefore, there is a need for a dual flush toilet which allows for easy of operation and provides operation and design similar to current commercially used systems.

SUMMARY OF THE INVENTION

One embodiment of the invention relates to systems and apparatus for providing more than one flush volume. A user is able to select between a greater and a lesser flush volume, either via manual actuation or automatic actuation.

In one embodiment, the flush device relates to a handle comprising a housing mountable to a valve body having diaphragm valve disposed therein with a stem extended downwardly therefrom. The handle pivotally is mounted to the housing and engagable with the stem via a plunger. The plunger has an outer end for engaging the handle, an inner end for engaging the stem, and a shank therebetween, the plunger being axially slidable through a passage in a bushing. The bushing is positioned between the handle and the valve. The passage comprises a first axis and a second axis, the axes in substantially the same vertical plane and intersecting at a point. The point of intersection is a pivot point of the plunger. Actuation of the handle in a first direction moves the plunger axially along the first axis and actuation of the handle in a second direction moves the plunger axially along the second axis.

In one embodiment, the pivot point is proximate the valve body. In another embodiment the pivot point is opposite the valve body. In one embodiment, the first axis is horizontal and the second axis is tilted either up or down therefrom. In another embodiment, the passage comprises a third axis which is tilted in relation to the first axis opposite the tilt of the second axis.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 3A-3C illustrate embodiments having a pivot point proximate the handle and FIG. 3D-F having a pivot point proximate the valve body;

DETAILED DESCRIPTION OF THE PREFERRED EMBODIMENTS

Figure 1:
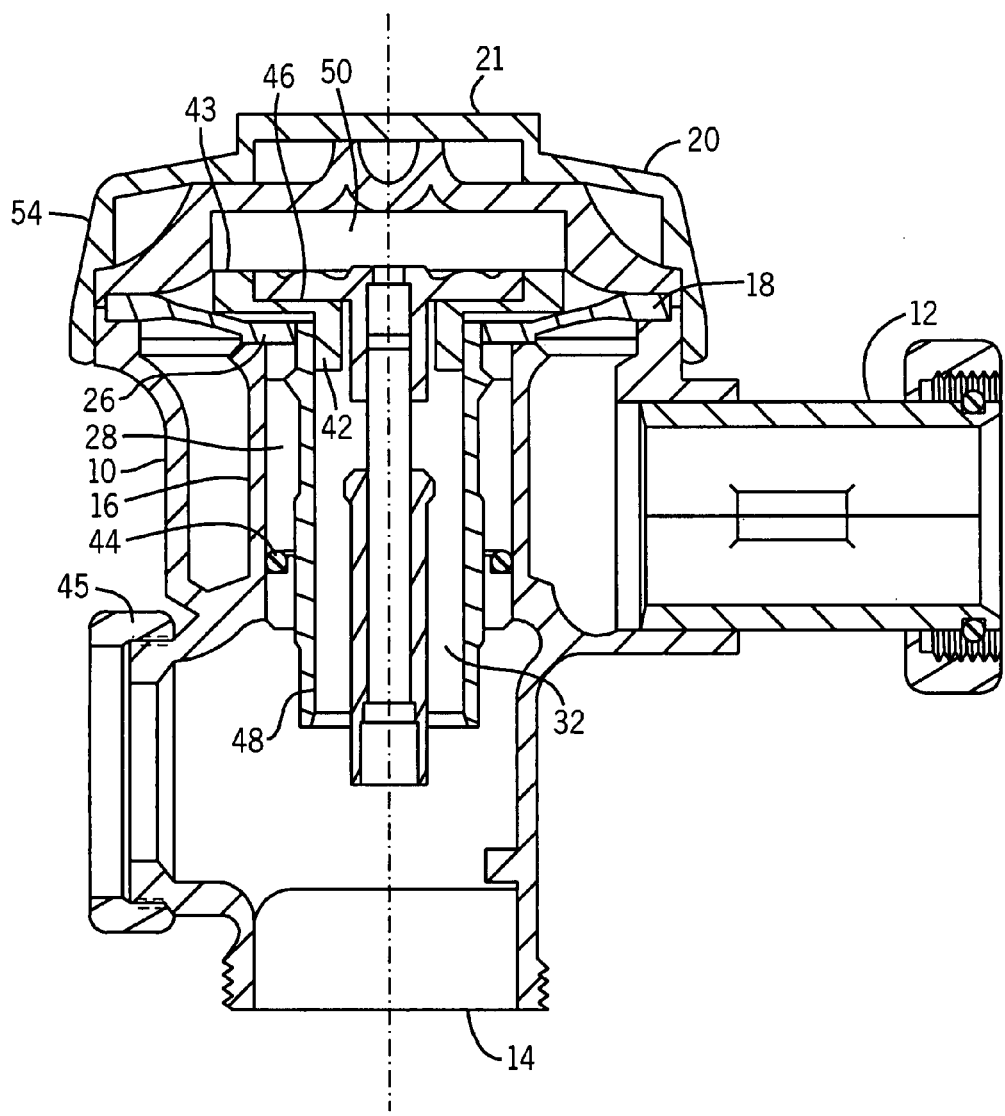
FIG. 1 illustrates a longitudinal cross-section of a valve body.

The present invention relates to a flush valve system having at least two flush volumes. As illustrated in FIG. 1, the flush valve system 10 of the present invention includes a body 11 having an inlet 12 and an outlet 14. When installed the inlet 12 is connected to a water supply [not shown] and the outlet 14 is connected to a fixture [not shown] such as a toilet or urinal. A valve member is indicated generally at 16. The valve member 16 may be any of the various assemblies shown in the art that utilize a plunger and sleeve mechanism. In the illustrated embodiment, the valve member 16 is a valve assembly but it could be otherwise, such as a piston assembly. In one embodiment, the valve member 16 includes a diagram 18 peripherally held to the body 11 by an inner cover 20. The diaphragm 18 is seated upon a shoulder 22 at the upper end of body 11 by an inner cover 20. The diaphragm edge 52 of the diaphragm 18 is clamped in this position by the inner cover 20. An outer cover 21 is attached to the body 11 to hold the inner cover 20 in position.

The valve member 16, in addition to diaphragm 18 and the relief valve 30, includes a retaining disk 43, a refill ring 42 and a flow control ring 44. The underside of the retaining disk 43 is attached, such as threadedly, to a collar 46, which in turn is attached, such as threadedly, at its exterior to a chamber flow sleeve 48 which carries the refill ring 42. The above described assembly of elements firmly holds the diaphragm 18 between the upper face of the refill ring 42 and a lower facing surface of the collar 46. Above the valve member 16 is a pressure chamber 50 which maintains the valve member 16 in a closed position when the flush valve system 10 is in a resting state, i.e. not being flushed.

Figure 2:
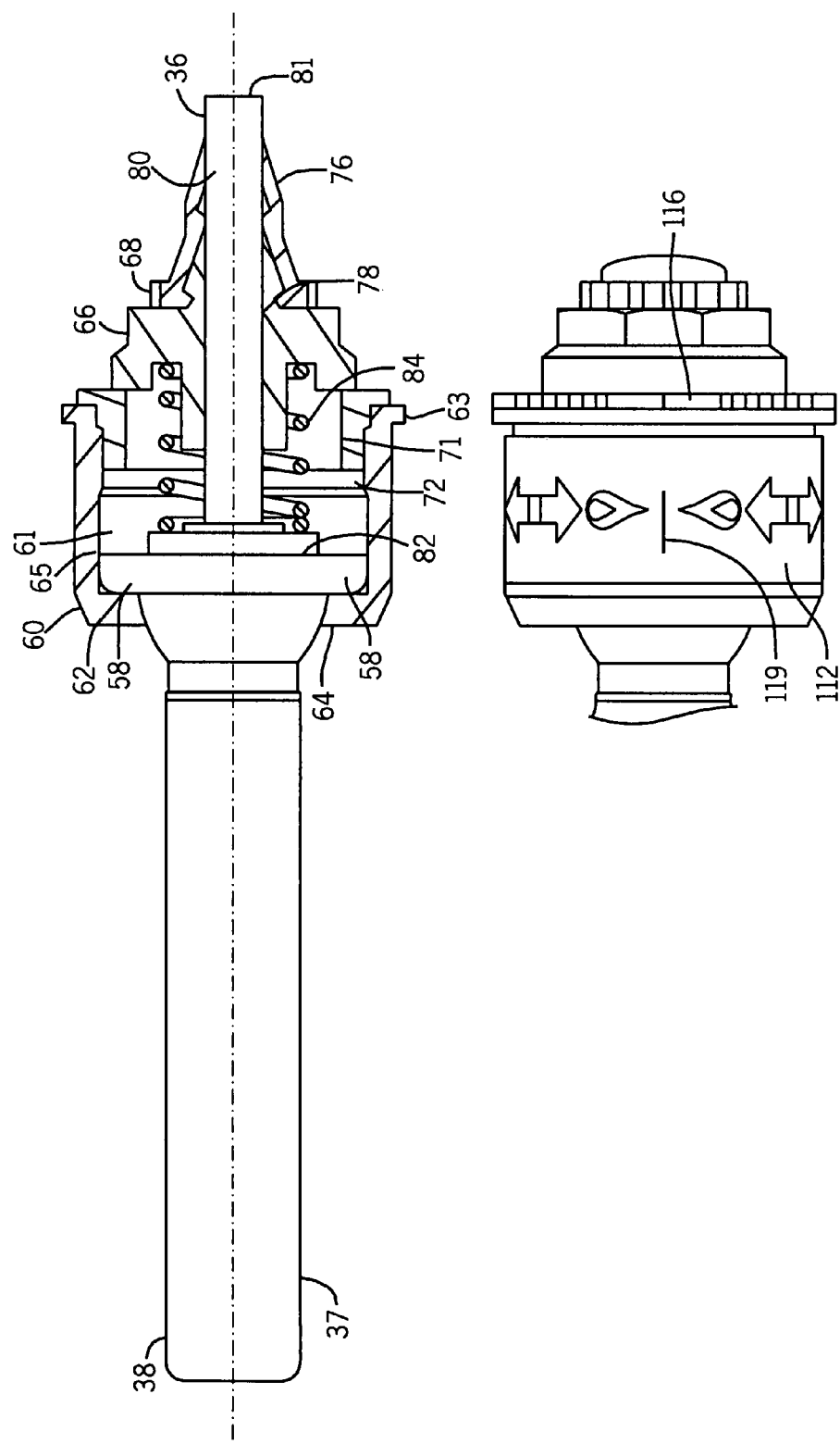
FIG. 2 illustrates a longitudinal cross-section of the handle assembly.

The valve member 16, is closed upon a valve seat 26 formed at the upper end of a barrel 28. The barrel 28 forms the fluid conduit connecting the valve seat 26 with outlet 14. The valve member 16 includes a relief valve 30 having a downwardly extending stem 32, in one embodiment telescopically carrying a movable sleeve 34. The handle assembly 37 of the present invention is described in further detail below and illustrated in FIG. 2. In general, the handle assembly 37 includes a handle 38 that actuates the plunger 36, manually or automatically. Sleeve 34 is positioned for contact by a plunger 36 when operated by a handle 38.

As is known in the art, when the handle 38 is operated, the plunger 36 will contact sleeve 34, tilting the relief valve 30 off its seat on the retaining disk 43. This will permit the discharge of water within the pressure chamber 50 down through the chamber flow sleeve 48. Inlet pressure will then cause the diaphragm 18 to move upwardly off its seat 26, permitting direct communication between the inlet 12 and the outlet 14 through the space between the bottom of the valve member 16 and the seat 26. The raising of the diaphragm 18 also lifts the relief valve sleeve 34, allowing it to clear the plunger 36 and return to a vertical, non-tilted position even if the user has held the handle 38 in an actuated position. Once the sleeve 34 clears the plunger 36 the relief valve reseats on the retaining disk 43. As soon as this operation has taken place, the pressure chamber 50 will begin to fill through the filter and bypass orifice 54 in the valve assembly. As flow continues into the pressure chamber 50, the valve assembly will move back down toward its valve seat 26 and when it has reached that position, the flush valve will be closed.

It will be appreciated that as a result of the interaction of the sleeve 34, stem 32, and diaphragm 18, the position on the sleeve's vertical axis at which the plunger 36 contacts the sleeve 34 as well as the distance the plunger 36 travels after initially contacting the sleeve 34 (generally referred to as "the throw" of the plunger 36) control the volume of water that will flow past the diaphragm 18. Dropping the plunger tip 35 to a lower position will permit the sleeve 34 of the relief valve 30 to clear the plunger tip 35 sooner than is the case when the plunger travels on the horizontal axis and the tip is at position 108. As a result of the earlier plunger clearance, the relief valve 30 closes sooner. This allows reestablishment of the pressure in chamber 50 sooner, resulting in earlier closure of the diaphragm 18 and lesser volume per flush cycle. So when the user pushes the handle 38 upwardly, the plunger 36 will be angled downwardly and there will be a minimum or reduced flush. When the user pushes the handle 38 in any direction but up, the plunger 36 will move on the horizontal axis and a greater or maximum flush volume will result. Similarly, the opposite motion of the plunger tip 35 results in the opposite effect, i.e. the sleeve 34 is not able to clear the plunger tip 35 until later and thus the relief valve 30 remains open longer.

Figure 7A:
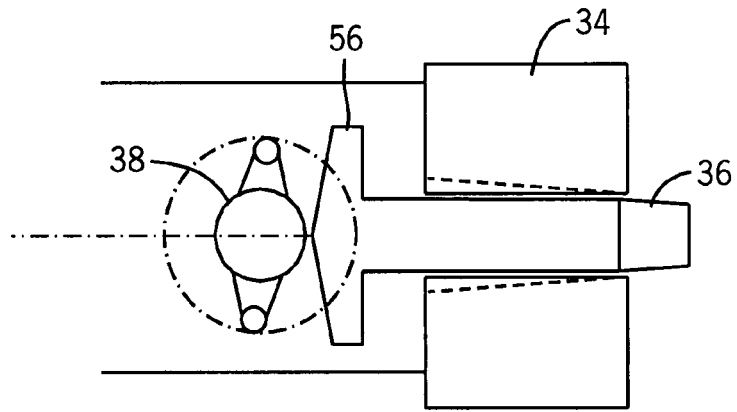
FIGS. 7A-C illustrate the operation of one embodiment of the invention having an automatic handle and a conical plunger head.
Figure 7B:
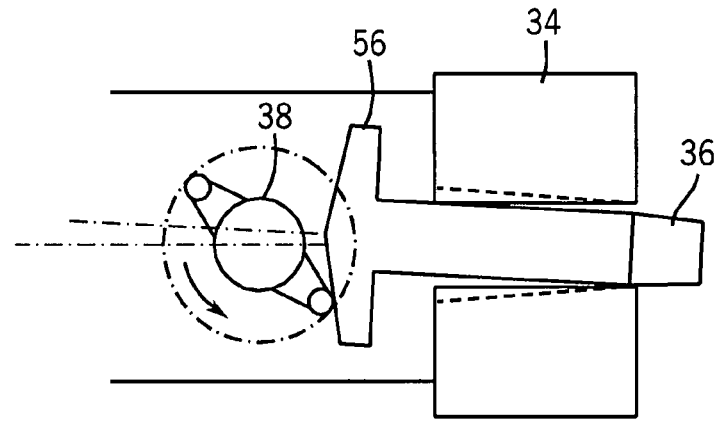
Figure 7C:
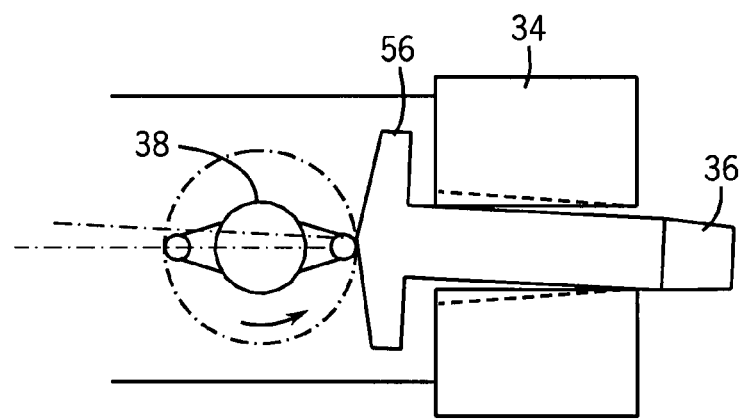

The handle assembly 37 fits through an opening in the valve body 11 and is retained therein. In one embodiment, the handle assembly 37 is retained on the valve body 11 by a nut 45. The handle assembly 37 includes the handle 38 having an inner end 39 proximate valve body and an outer end 40 opposite the valve body 11. The handle 38 includes a face plate 58 at its inner end 39. The face plate 58 is held within a chamber 61 formed by a handle socket 60. In one embodiment, the handle 38 is partially disposed within the handle socket 60. The socket 60 includes an inner end 63 proximate the valve body 11 and an outer end 64 distal the valve body 11. An inwardly extending flange 62 on the socket's outer end 64 retains the handle face plate 58. A covering 65 may line the socket chamber 61 and flange 62. In one embodiment, the inner end 63 of the socket 60 is threaded to the bushing 66 in one embodiment. The skirt 71 is threaded to the socket 60 in one embodiment. The handle assembly 37 may include a handle 38 for manual activation or engagable with an automatic actuation mechanism (FIG. 7).

The bushing 66 has a plunger sleeve 68 defining a bore or passage 78 in the handle assembly 37 and an outer skirt 71 joined by a wall 72. The passage 78 having an inner end 77 proximate the valve body 11 and an outer end 79 proximate the handle 38. Further details of the passage 78 will be described below. The inner end 69 of the plunger sleeve 68 has, in one embodiment, a beveled nose 74 that mounts a handle packing or seal 76. The plunger 36 includes a shank 80 and an inner end 81 proximate the valve body 11 and an outer end 82 opposite the valve body 11. In one embodiment, a head 83 is positioned on the outer end 82 of the plunger shank 80. The head 83 interacts with the face plate 58 of the handle 38. In an exemplary embodiment, the handle assembly 37 includes a biasing mechanism 84. The biasing mechanism 84 provides force to retain the handle 38 in a neutral (i.e. horizontal) position despite the force of gravity. In one embodiment, a compression spring or other suitable biasing device 84 fits between the bushing 66 and the head 82 to urge the plunger 36 into engagement with the face plate 58 of the handle 38.

In one embodiment, it can be seen that the diameter of the passage 78 (as defined by sleeve 65) is at its smallest, just slightly larger than that of the plunger 36. Thus, the plunger 38 can slide and tilt freely in the circular opening 92 but it cannot move up, down or sideways appreciably. This contrasts with the oval opening 94 which permits appreciable up and down movement of the plunger at that point. The result of the combination of the passage 78 and the openings 92, 94 is the plunger 38 can tilt up and down as well as slide axially.

Figure 3A:
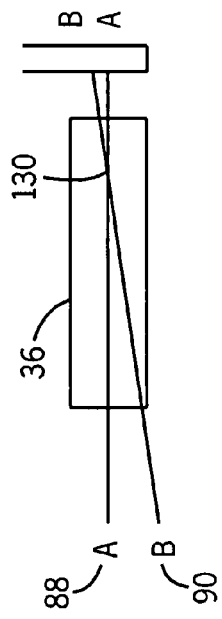
FIGS. 3A-3F illustrate various handle and plunger arrangement embodiments.
Figure 3B:
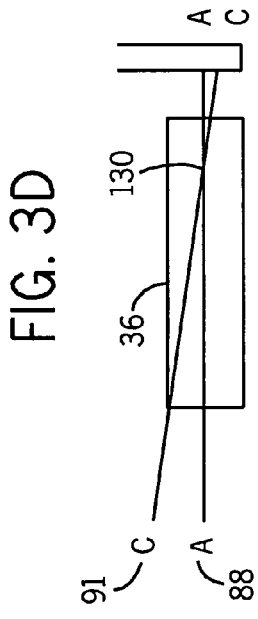
Figure 3C:
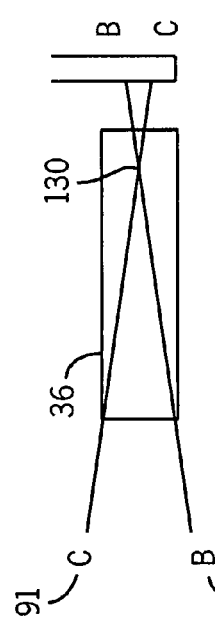

The present invention provides a mechanism to engage the sleeve 34 with the plunger 36 at two or more positions along the vertical axis of the sleeve 34. FIGS. 3A-F depict several embodiments which provide two or more flush volumes. FIGS. 3A-3C illustrate embodiments having a pivot point 130 proximate the handle 38. In on embodiment, the handle 38 engages the plunger 36 generally as described above. A movement of the handle 38 pivoting the plunger 36 about pivot 130 such that the inner end of the plunger pivots, resulting in a changed flush volume.

Figure 3D:
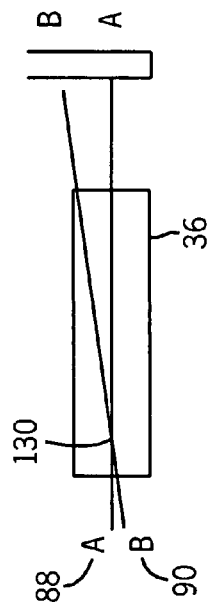
Figure 3E:
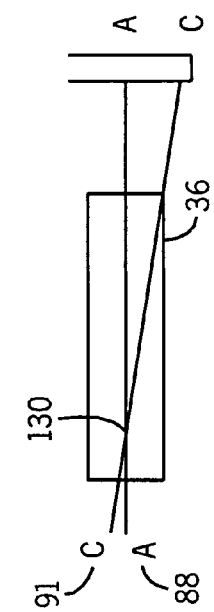
Figure 3F:
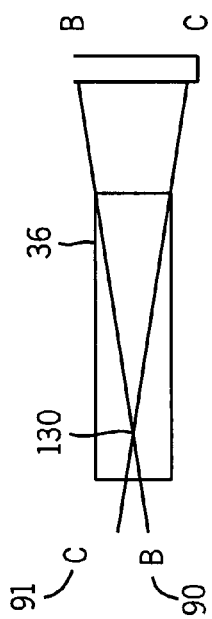

The embodiments illustrated in FIGS. 3D-F have a pivot point 130 proximate the valve body. The positioning of the pivot point at the opposite end of the plunger 36 from the handle 38 results in an increased need for a plunger 36/handle 38 interface able to create a moment to pivot the plunger 36. Motion of the handle 38 pivots the plunger 36 about the pivot 130, resulting in a changed flush volume.

Figure 6A:
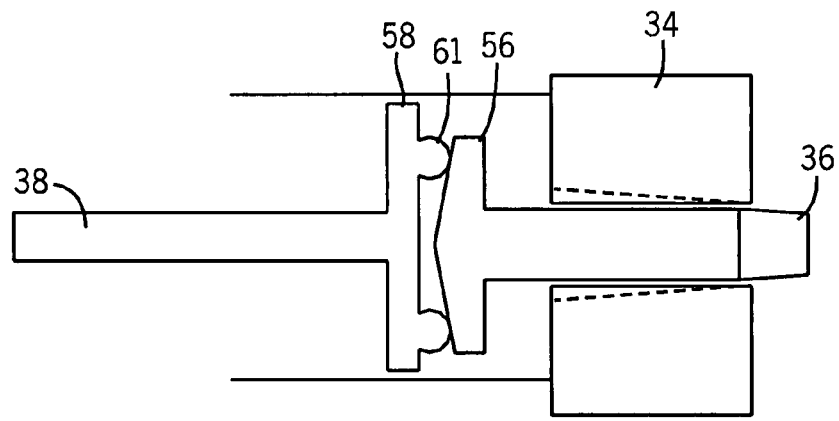
FIGS. 6A-C illustrate the operation of one embodiment of the invention having a manual handle with a bead and a conical plunger head.
Figure 6B:
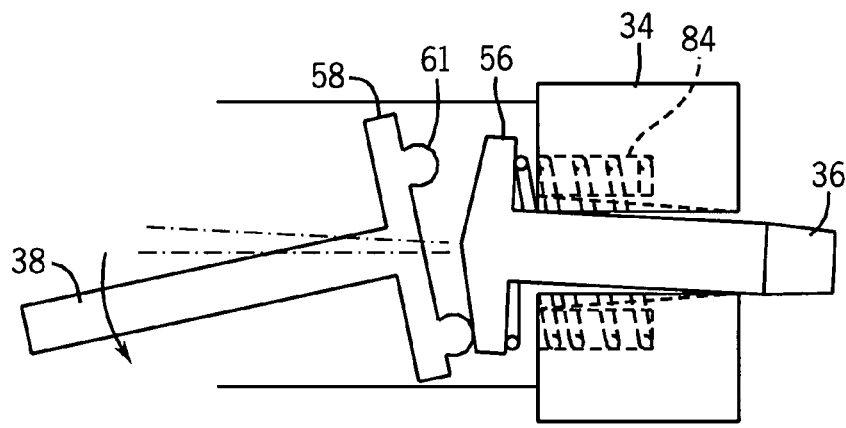
Figure 6C:
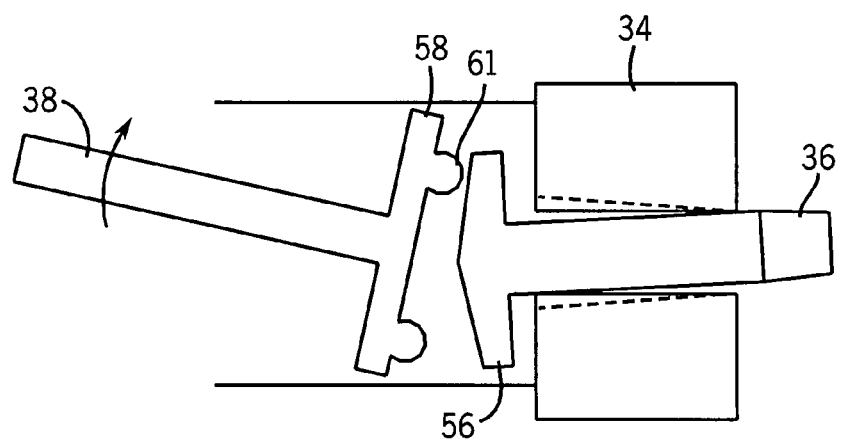

The interface of the handle 38 and the plunger 36 maybe any of the various designs that achieve the movement of the plunger 36 about the pivot point 130 as dictated by statics. As such, the embodiments utilizing at the inner end, i.e. proximate the valve body 11 rather than the handle 38, generally require a plunger head 83 and or a handle face plate 58 which has a particular shape designed to create a moment. In one embodiment, the plunger 36 of FIGS. 3A and B include head 83 having a flattened conical shape (best illustrated in FIG. 6). A downward movement of the handle 38 pivots the plunger upward in this embodiment. The plunger head 83 may comprise any shape to enable the creation of a moment to pivot the plunger about the axis. For example, an alternative embodiment utilizes an inverted flattened conical shape and imparts the opposite relationship between handle 38 movement and plunger 36 pivot, i.e. a downward movement of the handle 38 pivots the plunger 36 downward as well. Thus, the handle 38/plunger 36 interface maybe selected to provide a specific use profile.

As can be seen in FIGS. 3A-F, the plunger 36 may be provided with a plurality of axes. For example, instead of having the widened opening of the passage at the outside end of the sleeve, it could be at the inner end. Or, instead of having the lowermost edge of the passage be horizontal and the uppermost edge be angled as shown, this arrangement could be reversed. A further alternative is to provide a sleeve passage with a horizontal axis and an angled axis wherein the inner end of the plunger is angled above horizontal. In that case the horizontal travel, caused by an upward actuation of the handle 38, would provide the lower flush volume. Similarly, the upwardly angled travel, caused by a downward actuation of the handle 38, would provide the higher volume flush. Some shortening of the relief valve sleeve might be needed in conjunction with this setup. Yet another possible alternate construction of the bushing passage 78 is to make the inside diameter of the bushing passage 78 appreciably larger than the outside diameter of the plunger. This would cause the plunger to tilt somewhat no matter which direction the handle 38 is actuated, but only tilting in the vertical plane would affect the volume of the flush.

In one embodiment, shown in FIGS. 3A and 3D, the plunger includes an axis A-A which is substantially horizontal, similar to traditional plunger 36 arrangements. The plunger 36 of FIGS. 3A and 3D is also provided with an axis B-B which is tilted upward from the axis A-A but remains in the same vertical planes such that axes A-A and B-B are non-parallel and intersect at the pivot point 130. When the plunger travels along axis B-B, it strikes the sleeve 34 at a higher point on the sleeve's vertical axis resulting in a higher flush volume than if the plunger 36 travels along axis A-A. Thus, for the embodiment of FIG. 3A, a downward motion of the handle 38 results in a maximum flush volume and other motions result in a lesser flush volume. For the embodiment of FIG. 3D, an upward motion of the handle 38 results in a reduced flush volume and a downward or lateral motion results in a maximum flush volume.

In another embodiment, shown in FIGS. 3B and 3E, the plunger includes an axis A-A which is substantially horizontal, similar to traditional plunger 36 arrangements. The plunger 36 of FIGS. 3B and 3E is also provided with an axis C-C which is tilted downward from the axis A-A but remains in the same vertical planes such that axes A-A and C-C are non-parallel and intersect at the pivot point 130. When the plunger travels along axis C-C, it strikes the sleeve 34 at a lower point on the sleeve's vertical axis resulting in a lower flush volume than if the plunger 36 travels along axis A-A. Thus, for the embodiment of FIG. 3B, an upward motion of the handle 38 results in a reduced flush volume and a downward or lateral motion results in a maximum flush volume. For the embodiment of FIG. 3E, an upward motion of the handle 38 results in a reduced flush volume.

In one embodiment, shown in FIGS. 3C and 3F, the plunger includes an axis A-A which is substantially horizontal, similar to traditional plunger 36 arrangements. The plunger 36 of FIGS. 3C and 3F is also provided with an axis B-B which is tilted upward from the axis A-A and an axis C-C which is tilted downward from axis A-A. All of these axes remain in the same vertical planes such that axes A-A, B-B, and C-C are non-parallel and intersect at the pivot point 130. When the plunger travels along axis B-B, it strikes the sleeve 34 at a higher point on the sleeve's vertical axis resulting in a higher flush volume than if the plunger 36 travels along axis A-A or axis C-C. When the plunger travels along axis C-C, it strikes the sleeve 34 at a lower point on the sleeve's vertical axis resulting in a lower flush volume than if the plunger 36 travels along axis A-A or axis B-B. If the plunger travels along axis A-A, the flush volume is between the volume triggered by a path along B-B and that trigged by a path along C-C. Thus, for the embodiment of FIG. 3C, a downward motion of the handle 38 results in a maximum flush volume and an upward motion results in reduced flush volume.

The embodiments shown in FIGS. 3A, 3B, 3D, and 3E exhibit an orientation of the handle 38 to the plunger 36 and to the valve body 11. For embodiments where the plunger 36 has a horizontal axis A-A and either a upward tilted axis B-B or a downward tilted axis C-C, the handle 38 and plunger 36 must be orientated correctly with each other and with the bushing 66 and valve body 11 to achieve the appropriate tilting of the plunger 36 within the passage 78. That is, because of the need to create a moment in order to tilt the plunger 36, the plunger 36 and or handle 38 include a specific profile. Since this tilt of the axis (i.e. the plunger 36 only occurs upward (FIGS. 3A and 3D) or downward (FIGS. 3B and 3E), only one direction of operation of the handle 38 need achieve a moment.

However, in some embodiments of the handle assembly 37, the orientation of the handle 38 to the plunger 36 and to the valve body 11 is irrelevant to the flush volume, i.e. assembly is orientation neutral. Embodiments with no orientation provide for simpler assembly and maintenance. As opposed to FIGS. 3A-B and 3D-E, the embodiments of FIGS. 3C and 3F provide for both upward and downward tilting and thus require a handle 38/plunger 36 interface that is capable of creating a moment regardless of whether the handle 38 is moved up or down. Such an orientation-free design is particularly useful where it is desired to have an ambidextrous flush valve assembly so that the handle 38 may be either left-handed or right-handed, particularly where the handle 38 is automatically actuated (See FIGS. 7A-C).

Figure 4A:
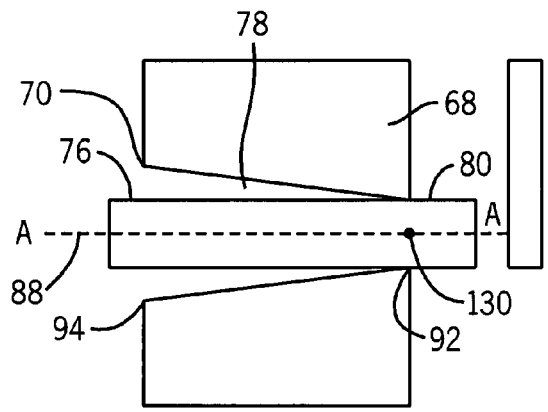
FIGS. 4A-C illustrate the operation of one embodiment of the invention.
Figure 4B:
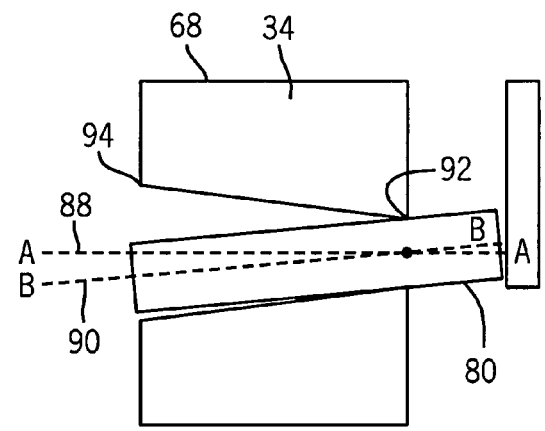
Figure 4C:
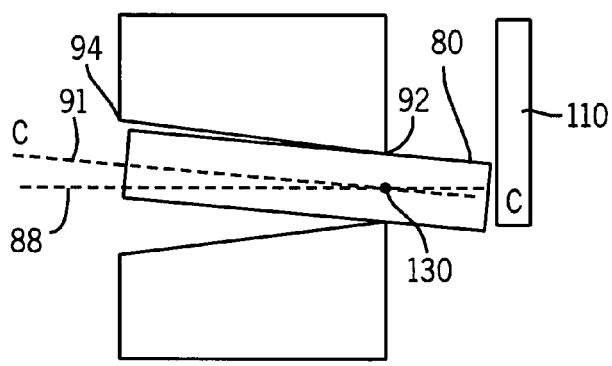
Figure 5A:
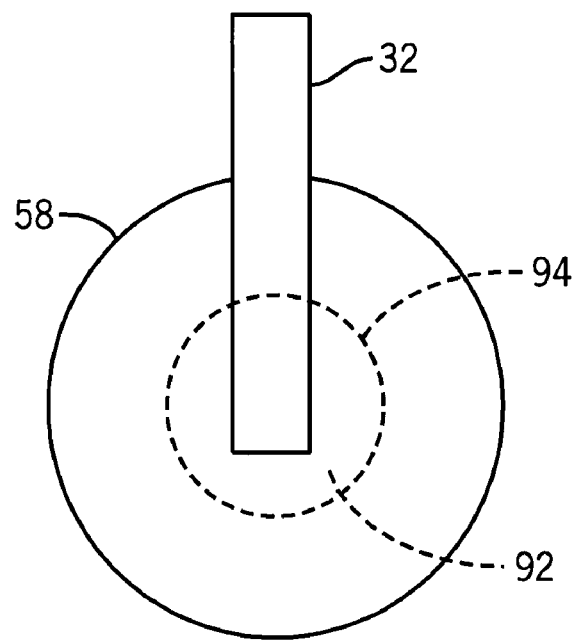
FIG. 5a illustrates a view along axis A-A of FIG. 1, illustrating the relative circumferences of the plunger head, the bore at the pivot point, and the opposite end thereof the bore.
Figure 5B:
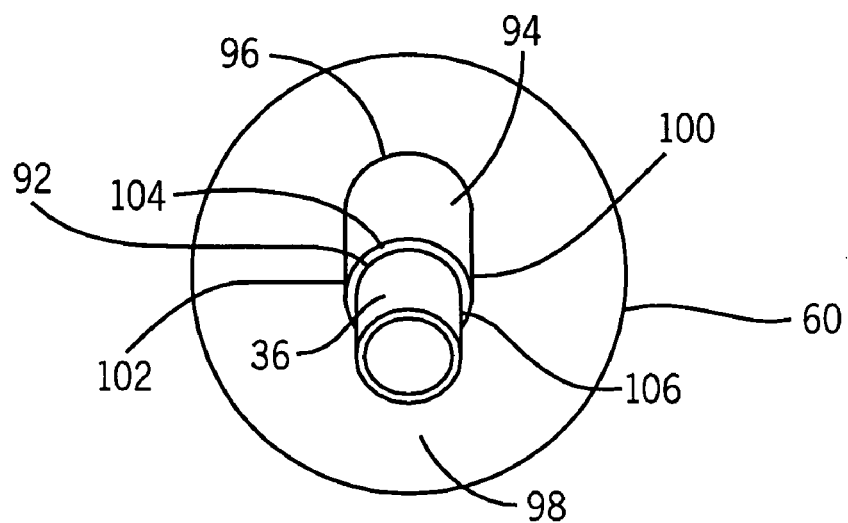
FIG. 5b illustrates a perspective partial cut-away view of the plunger and plunger sleeve along axis A-A.

Turning now to FIGS. 4A-C, details of the bushing passage 78 of one embodiment (that illustrated generally in FIG. 3F) are shown. The passage 78 can be considered to be defined by a plurality of bores, such as first and second bores 88 and 90 extending through the plunger sleeve 68. Each bore corresponds with an axis as described above. For example, first bore 88 corresponds with axis A-A and second bore 90 corresponds with axis B-B (a third bore 91 would correspond with axis C-C). The bores 88, 90 are preferably substantially centered on the same vertical plane. The first bore 88 is horizontal and defines a horizontal plunger travel axis A. The second bore 90 is not horizontal. The second bore 90 is tilted from the end adjacent the handle 38 to the end adjacent the valve member 16 at the outer end 70 of the plunger sleeve 68 and defines an angled plunger travel axis B. The second bore can be considered a tilted portion of the bushing passage 78. The bores preferably each have a diameter slightly greater than that of the plunger shank 80. The bores overlap and merge together at the inner end 69 of the plunger sleeve 68 so that they define a substantially circular opening 92 at the inner end 69. At the outer end 94, the bores' divergent axes result in an oval-shaped opening. FIG. 5A illustrates a view along axis A-A illustrating the relative shape and positions of the two openings. FIG. 5b illustrates a perspective partial cut-away view of the plunger 36 and plunger sleeve 68 along axis A-A. In one embodiment (FIGS. 3B and 3E), at the outer end 70 of the plunger sleeve, the second bore 90 is above the first bore 88. In another embodiment, the outer end of the second bore 90 is below the first bore 88. As seen in FIG. 5, the opening 94 at the outer end 70 of the plunger sleeve 68 includes an upper arcuate portion 96, a lower portion 98, and a pair of extension portions 100 and 102 joining the upper and lower arcuate portions. The result is a somewhat oval, although not strictly elliptical, shaped opening 94. As seen on FIG. 5, the opening 92 at the inner end 69 of the plunger sleeve 68 includes an upper arcuate portion 104, a lower arcuate portion 106. In one embodiment the height of the extension portions at the opening has shrunk to essentially zero so the arcuate portions 104 and 106 join one another.

The operation of one embodiment of the handle assembly 37 will now be described. In one embodiment, shown in FIGS. 3D and 3F, downward motion of the handle 38 results in a reduced flush volume and an upward motion results in a standard or larger flush volume. The downward movement of the handle 38 causes the face plate 58 to pivot about the upper portion of the plate (which remains in contact with the socket flange 62) with the lower portion of plate 58 moving to the right. This places a force $F_{handle}$ on the plunger 36, the plunger 36 remains centered on the horizontal plunger travel axis A-A. The handle 38 in an actuated position where it has been moved up by a user. Upward movement of the handle 38 causes the face plate 58 to pivot about the lower portion of plate with the upper portion of plate 58 moving to the right. This places a force $F_{handle}$ on the upper portion of the plunger head 58. With noted forces $F_{bushing}$ on the plunger 36, the plunger 36 tilts upward at the left end and downward at the right end, taking the plunger 36 into the second bore 90 where it is aligned with the angled plunger travel axis B. This lowers the inner tip of the plunger 36.

As will be evident from the above description, the second bore 90 provides a tilt portion of the bushing passage 78. This produces a non-symmetrical configuration of the passage, as compared to having only a simple, single horizontal bore at 88. In order to provide the vertical plunger tip drop D with the attendant lower flush volume, the bushing 66 must be installed on the valve body such that the first and second bores 88, 90 re oriented in a generally vertical plane with the second bore 90 on top. However, since the bores are in the interior of the bushing 66 an installer can see neither the bores nor the indicia 86 once the bushing 66 goes into the valve body. The present invention solves this problem by providing an externally-visible mark or indicator 85 showing the location of the second bore. The wall 72 may have indicia 85 thereon which indicates which side of the busing 66 has an angled axis as described above. The indicia 85 may be in the form of a depression 86 in the wall. The indicia 85 will assist the installer in orienting the bushing 66 properly. Other indicia 85 may be used without varying from the scope and purpose of the invention. In the illustrated embodiment the mark 85 is simply a line which may be suitably printed on a label that is attached to the exterior portion 112 of the socket 60. The label may optionally carry additional graphics 116 to instruct the user regarding the availability of the reduced flush alternative. Instead of a label, the mark 114 could be engraved or otherwise formed directly on the socket. The mark 114 can be used in conjunction with the indicia 86 on the bushing 66. That is, at the time of installation of the handle assembly 37 on to the valve body 11, the installer can look to ensure that the mark 114 is rotationally aligned with the indicia 86 and then make sure that the mark 114 is at the top of the handle assembly 37 when the nut 45 is tightened. This will result in the bushing passage 78 having the proper orientation relative to the valve body 11 and relief valve sleeve 34. Further assurance of proper alignment may be added by placing a flat 118 on the external flange of the bushing 66. Aligning the mark 114 with the flat 116 during assembly of the handle 38 and then placing the mark at the top of the handle 38 during installation of the handle assembly 37 will result in the correct orientation.

In one exemplary embodiment actuation of the handle 38 downward results in a reduced flush volume and actuation of the handle 38 upward results in a standard flush volume. It will be appreciated that this orientation may be reversed based on the desired manner of operation of the water closet. In one embodiment shown in FIG. 6, the plunger head comprises a tapered conical head and the handle face plate 58 includes a bead 61. The bead provides a discrete contact point to engage the conical head. The placement of a bead around a circumference of the faceplate results in the handle 38 having no discrete orientation in relation to the plunger 36, thus providing for easier and more error free assembly.

In this embodiment, actuation of the handle 38 in any direction other than upward or downward results in a reduced flush volume that depends on the exact position of the handle 38 during actuation. The plunger 36 is provided with a tapered head 56 having a substantially conical shape where the diameter is much greater than the height. At least one protrusion 60, such as a bead 61, engages the conical surface of the tapered head 56 when the handle 38 is actuated. In operation, actuation of the handle 38 results in the plunger 36 tilting in the opposite direction of the motion of the handle 38. For example, where the handle 38 is actuated upwards, the bead 61 engage the top portion of the conical surface, exerting force sufficient to both move the plunger 36 laterally to engage the stem and also to pivot the plunger 36 in relation to the resting plane so that the plunger 36 strikes the stem at a position above the resting plane. The higher striking point of the plunger 36 on the stem results in the valve seat being displaced longer, thus providing a longer flush, i.e. more volume. Likewise, the opposite motion of the handle 38 results in the opposite impact on the flush volume.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. For example, while the present invention has primarily been described in regard to on embodiment of a valve member, it will be appreciated that various other embodiments of valve members may be utilized without departing from the spirit and scope of the invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A flush valve assembly comprising:
   a housing mountable to a valve body having diaphragm valve disposed therein with a stem extended downwardly therefrom;
   a handle pivotally mounted to the housing and engagable with the stem via a plunger;
   the plunger having an outer end for engaging the handle, an inner end for engaging the stem, and a shank therebetween, the plunger being axially slidable through a passage in a bushing, the bushing positioned between the handle and the valve;
   the passage in the bushing comprising a first axis and a second axis, the axes in substantially the same vertical plane and intersecting at a point, the point of intersection being a pivot point of the plunger;

wherein actuation of the handle in a first direction moves the plunger axially along the first axis and actuation of the handle in a second direction moves the plunger axially along the second axis.

2. The flush valve assembly of claim 1, wherein the passage has a circular cross-section at the pivot point.

3. The flush valve assembly of claim 1, wherein the passage exhibits an oval cross-section at an end opposite the pivot point.

4. The flush valve assembly of claim 1, wherein an inner end of the plunger comprises a plunger tip.

5. The flush valve assembly of claim 1, wherein the pivot point is positioned at substantially the inner end of the passage.

6. The flush valve assembly of claim 1, wherein the pivot point is positioned at substantially the outer end of the passage.

7. The flush valve of claim 1, wherein the first axis is substantially horizontal.

8. The flush valve of claim 7, further comprising a third axis, wherein the second axis and third axis are tilted in opposite directions from the first horizontal axis.

9. A handle assembly for using with a flush valve, the handle assembly comprising:
   a handle assembly housing comprising a handle, a plunger and a bushing all at least partially disposed therein;
   the handle pivotally mounted within the housing and engagable with the plunger;
   the plunger having an outer end for engaging the handle, an inner end, and a shank positioned therebetween and the plunger being axially slidable through a passage in the bushing, the bushing positioned opposite the handle within the housing;
   the passage comprising a first axis and a second axis in substantially the same vertical plane and which intersect, the point of intersection positioned substantially at the inner end of the passage being a pivot point of the plunger;
   wherein actuation of the handle in a first direction moves the plunger axially along the first axis and actuation of the handle in a second direction moves the plunger axially along the second axis.

10. The handle assembly of claim 9, wherein the passage has a circular cross-section at the pivot point.

11. The handle assembly of claim 9, wherein the passage exhibits an oval cross-section at an end opposite the pivot point.

12. The handle of claim 9, wherein the first axis is substantially horizontal.

13. The handle of claim 12, further comprising a third axis, wherein the second axis and third axis are tilted in opposite directions from the first horizontal axis.

14. The handle assembly of claim 9, wherein an outer end of the plunger comprise a head having a diameter substantially larger than the diameter of the plunger.

15. The handle assembly of claim 14, wherein the head comprises a flattened conical shape, the apex of the cone being nearest the handle.

16. The handle assembly of claim 14, wherein the head comprises an inverted flattened conical shape, the apex of the inverted cone being farthest from the handle.

17. A handle assembly comprising:
   a handle assembly housing comprising a handle, a plunger and a bushing all at least partially disposed therein;
   the plunger having an outer end for engaging the handle, an inner end configured to be engagable with a valve stem sleeve, and a shank positioned therebetween, the plunger being axially slidable through a passage in the bushing, the bushing positioned opposite the handle within the housing;
   the passage comprising a first axis and a second axis in substantially the same vertical plane and which intersect, the point of intersection being substantial at the outer end of the passage and being a pivot point of the plunger;
   wherein actuation of the handle in a first direction moves the plunger axially along the first axis and actuation of the handle in a second direction moves the plunger axially along the second axis.

18. The handle of claim 17, wherein the first axis is substantially horizontal.

19. The flush valve of claim 18, further comprising a third axis, wherein the second axis and third axis are tilted in opposite directions from the first horizontal axis.

20. A handle assembly comprising:
   a housing mountable to a valve body, the valve body having a diaphragm valve disposed therein with a sleeve extended therefrom;
   a handle pivotally mounted to the housing and engagable with the valve via a plunger;
   the plunger having an outer end for engaging the handle, an inner end for engaging the sleeve, and a shank positioned therebetween, the plunger being axially slidable through a bore in a bushing, the bushing positioned opposite the handle within the housing;
   the bore comprising a horizontal axis, first tilted axis and a second tilted axis all in substantially the same vertical plane and which intersect, the point of intersection being a pivot point of the plunger;
   wherein actuation of the handle in a first direction moves the plunger axially along the first tilted axis and actuation of the handle in a second direction moves the plunger axially along the second tilted axis and the plunger is positioned along the horizontal axis when not being actuated.

21. The handle assembly of claim 20, wherein the passage has a circular cross-section at the pivot point.

22. The flush valve assembly of claim 20, wherein the passage exhibits an oval cross-section at an end opposite the pivot point.

* * * * *